(12) United States Patent
Stevens et al.

(10) Patent No.: US 7,826,920 B2
(45) Date of Patent: Nov. 2, 2010

(54) TOTE-BASED WAREHOUSING SYSTEM AND METHOD

(75) Inventors: John K. Stevens, Stratham, NH (US); Paul Waterhouse, Selkirk, CA (US); Michael J. Vandenberg, Erin, CA (US)

(73) Assignee: Visible Assets, Inc., Mississauga, Ontario (CA)

( * ) Notice: Subject to any disclaimer, the term of this patent is extended or adjusted under 35 U.S.C. 154(b) by 547 days.

(21) Appl. No.: 11/622,662

(22) Filed: Jan. 12, 2007

(65) Prior Publication Data

US 2008/0228316 A1    Sep. 18, 2008

Related U.S. Application Data

(63) Continuation of application No. 10/892,500, filed on Jul. 16, 2004, now abandoned, which is a continuation-in-part of application No. 10/474,353, filed as application No. PCT/US02/10927 on Apr. 9, 2002, now abandoned.

(60) Provisional application No. 60/282,150, filed on Apr. 9, 2001, provisional application No. 60/359,350, filed on Feb. 26, 2002.

(51) Int. Cl.
*G06F 7/00* (2006.01)
(52) U.S. Cl. .................................. 700/215; 700/213
(58) Field of Classification Search ............... 700/213, 700/214, 225; 705/28, 29; 340/5, 9, 5.92, 340/10.1, 10.4, 539.1, 825.69, 825.72, 7.55, 340/7.56
See application file for complete search history.

(56) References Cited

U.S. PATENT DOCUMENTS

| | | | |
|---|---|---|---|
| 4,792,796 A | 12/1988 | Bradshaw et al. | |
| 4,821,197 A * | 4/1989 | Kenik et al. ................. | 700/106 |
| 4,821,291 A | 4/1989 | Stevens et al. | |
| 4,879,756 A | 11/1989 | Stevens et al. | |
| 4,937,586 A | 6/1990 | Stevens et al. | |
| 5,029,095 A * | 7/1991 | Kenik et al. ................. | 700/106 |
| 5,177,432 A | 1/1993 | Waterhouse et al. | |
| 5,245,534 A | 9/1993 | Waterhouse et al. | |
| 5,374,815 A | 12/1994 | Waterhouse et al. | |
| 5,472,309 A | 12/1995 | Bernard et al. | |
| 5,532,465 A | 7/1996 | Waterhouse et al. | |
| 5,533,606 A | 7/1996 | Yuyama | |
| 5,646,616 A | 7/1997 | Komatsu | |
| 5,781,443 A * | 7/1998 | Street et al. ................. | 700/214 |
| 5,875,434 A * | 2/1999 | Matsuoka et al. ............. | 705/28 |
| 5,877,962 A * | 3/1999 | Radcliffe .................... | 700/215 |
| 5,943,841 A | 8/1999 | Wunscher | |
| 6,032,127 A | 2/2000 | Schkolnick et al. | |
| 6,208,908 B1 | 3/2001 | Boyd et al. | |
| 6,308,109 B1 | 10/2001 | Yuyama et al. | |

(Continued)

*Primary Examiner*—Gene Crawford
*Assistant Examiner*—Ramya Prakasam
(74) *Attorney, Agent, or Firm*—Larson & Anderson, LLC

(57) ABSTRACT

A warehousing system includes a container for storing at least one item, a first electronic (e.g., radio frequency identification (RFID)) module associated with the first container, and a controller which wirelessly communicates with first electronic module, for directing a transfer of said at least one item to and/or from said first container. The inventive system may include, for example, a hybrid retail/warehouse system which includes a facility having a shelving area, and a picking area adjacent to the shelving area, and a layout so as to minimize a picking area and a walking distance between a picking area and a shelving area.

20 Claims, 14 Drawing Sheets

U.S. PATENT DOCUMENTS

| | | | |
|---|---|---|---|
| 6,505,093 B1 | 1/2003 | Thatcher et al. | |
| 6,650,225 B2 * | 11/2003 | Bastian et al. | 340/5.92 |
| 7,028,861 B2 | 4/2006 | Sayers et al. | |
| 7,049,963 B2 | 5/2006 | Waterhouse et al. | |
| 7,516,848 B1 * | 4/2009 | Shakes et al. | 209/34 |
| 2002/0103569 A1 * | 8/2002 | Mazur | 700/216 |
| 2004/0053641 A1 | 3/2004 | Leung et al. | |
| 2004/0069849 A1 | 4/2004 | Stevens et al. | |
| 2004/0149822 A1 | 8/2004 | Stevens et al. | |
| 2004/0205350 A1 | 10/2004 | Waterhouse et al. | |
| 2004/0243278 A1 * | 12/2004 | Leishman | 700/214 |
| 2005/0029345 A1 | 2/2005 | Waterhouse et al. | |
| 2005/0043850 A1 | 2/2005 | Stevens et al. | |
| 2005/0043886 A1 | 2/2005 | Stevens et al. | |
| 2005/0083213 A1 | 4/2005 | Stevens et al. | |
| 2005/0086983 A1 | 4/2005 | Stevens et al. | |
| 2005/0149226 A1 | 7/2005 | Stevens et al. | |
| 2005/0205817 A1 | 9/2005 | Marcichow et al. | |
| 2005/0251330 A1 | 11/2005 | Waterhouse et al. | |
| 2006/0124662 A1 | 6/2006 | Reynolds et al. | |
| 2006/0128023 A1 | 6/2006 | Waterhouse et al. | |
| 2006/0164232 A1 | 7/2006 | Waterhouse et al. | |
| 2006/0220857 A1 | 10/2006 | August et al. | |
| 2006/0232417 A1 | 10/2006 | August et al. | |

* cited by examiner

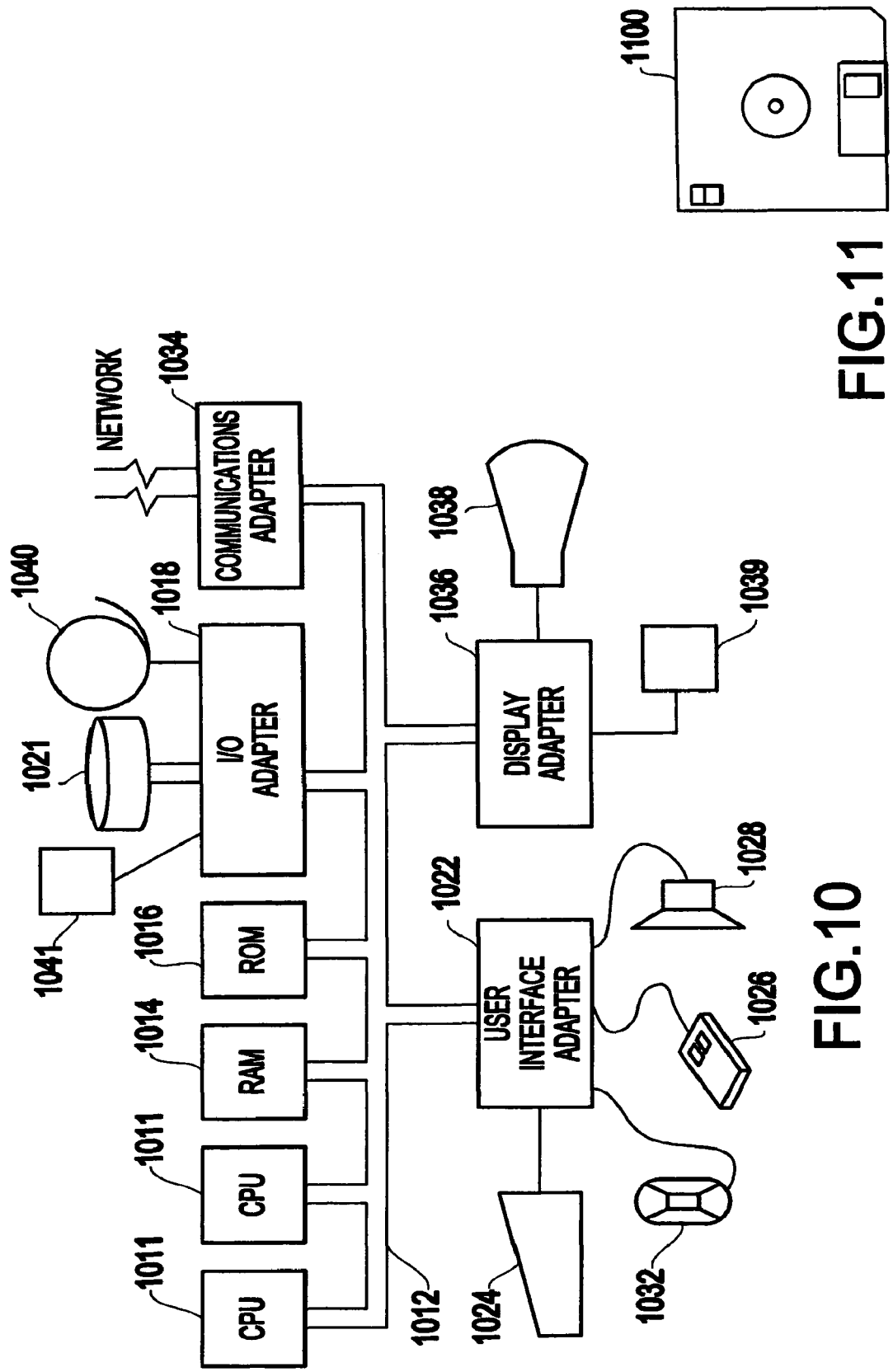

TOTE-BASED WAREHOUSING SYSTEM AND METHOD

This application is a continuation of U.S. application Ser. No. 10/892,500 filed on Jul. 16, 2004, which is a continuation-in-part of U.S. application Ser. No. 10/474,353 filed on Apr. 9, 2002, which claims priority from U.S. application No. 60/282,150 filed on Apr. 9, 2001 and from U.S. application No. 60/359,350 filed on Feb. 26, 2002, each of which is incorporated herein by reference for all purposes.

BACKGROUND OF THE INVENTION

1. Field of the Invention

The present invention generally relates to a warehousing system and method, and more particularly, a warehousing system and method which may be used in a hybrid retail/warehouse facility.

2. Description of the Related Art

Many inventory-based businesses rely exclusively or heavily on the Internet. However, such businesses (e.g., dot-coms) have often failed, primarily because there are simply too few customers to carry costs. That is, the costs of fulfillment and operating overhead could simply not be covered with the actual customer base. However, the Internet customer base continues to grow by 25% each year, and so the potential for future profits appears evident. For instance, Amazon.com recently had its first profitable quarter ever.

A major barrier to growth for any inventory-based business is managing the physical warehouse, physical inventory, and fulfillment from warehouse to customer. Many companies sell "solutions" that include pick-to-light (PTL) or Dynamic Picking Systems, batch picking with tilt tray sorting, automated crane systems. A major problem with such conventional systems is that volume and throughput commitments must be established before capital and systems commitments are made. If the business plan is wrong and a warehouse faces unexpected expansion, it becomes quite expensive. If the business plan is wrong and the warehouse faces below target throughput, it is a financial disaster. Finally, if throughput is predictable, existing legacy systems are too expensive to change.

Any new initiatives especially retail based ventures must take a long hard look at fundamental economics, value chains and operating costs. For instance, one of the major economic inefficiencies in dotcom businesses is the Internet's dependency upon expensive "old economy" fulfillment channels. In addition, the dotcoms assume that any Internet retail business (i.e., "the e-tailer") was just like mail order.

After the dotcom collapse none of the fulfillment companies filed for Chapter 11. All claimed 10% to 20% annual growth in new business as a result of the Internet and appear to have had positive Internet cash flows from day one. However the high costs and inefficiencies of these fulfillment channels cause conventional systems to be expensive and inefficient and were directly responsible for the demise of many dotcoms.

More specifically, three basic types of fulfillment systems have been used for retail Internet-based businesses: Central High Volume Automated Warehouse (National Fulfillment Channel), Regional Medium Volume Warehouse (Regional Fulfillment Channel), and Regional Low Volume Store/Warehouse (Regional Fulfillment Channel)

Many examples exist for the first type of system or mail-order model, some successful and some not so successful. The best known success of the second type of conventional system is Corporate Express, with revenues of over $4 billion. In this second type of system, inventive system 100 (e.g., the inventive fulfillment chain) can cut fulfillment costs by as much as 50%.

The third type of system (e.g., Store/Warehouse approach) has worked on a small scale and certainly minimizes capital required to launch any Internet business. However, merely using conventional retail store systems does not have the ability to scale. In other words, merely utilizing a different fulfillment channel without major modifications to the store does not make economic sense for many reasons.

The major advantage of the third type of system (e.g., the retail Store/Warehouse approach) is that the sunk costs associated with inventory and inventory management can be shared by both the Internet and direct in-store retail sales. However, this type of system has two major shortcomings that make it not scalable.

First, the "value chain penalty". That is the product has come from manufacture to a pallet based central warehouse, broken down into "eaches" (e.g., single items), shipped to the store and prepared for shelf-based in-store sales. It has been handled maybe four or five times. The sunk cost for the product on the in-store shelf may be as much as 12% higher than if it were in an optimized "two touch" warehouse environment.

Second, inefficiencies created for the Internet business by an in-store environment where picking eaches and management of inventory is complicated and costly. For instance, many warehouse systems involve placing products on shelves and picking the products based on lights and displays attached to the shelf (e.g., a so-called "Pick and Put to Light" (PTL) system). These systems typically require physical addresses for each item and also require that a "picker" travel to the warehouse shelf to get an item.

Therefore, such conventional systems are inefficient and time consuming. For example, lead to pick rates of 100 or less per hour per employee are not uncommon. Indeed, the inventors believe the warehouse picking penalty for the Internet business might be as much as 4% on sales.

Thus, in the end the products will either cost more for the Internet customer, in addition to the actual fulfillment costs, or the products will cost more for in-store customer.

In addition, many warehousing systems, product distribution systems, and methods for storing items (e.g., medical devices such as heart valves, stents, endoscopes, sutures, shunts, etc.) are currently very inefficient. For example, many such items have an expiry date (e.g., a shelf life) after which the item is no longer usable and is thus, discarded. Currently, many such items are not used by their expiry date and are, therefore, discarded due to an inability to efficiently and effectively track inventory, store or warehouse these items.

SUMMARY OF THE INVENTION

In view of the foregoing and other problems, drawbacks, and disadvantages of the conventional systems and methods, an object of the present invention is to provide a cost and space efficient warehousing system and method which optimizes each employee's time and leads to highly efficient putting away" (e.g., re-shelving) of products and highly efficient picking of products, and which may be used in a hybrid retail/warehouse facility.

The inventive warehousing system includes a container (e.g., tote, package, packet, wrapper, envelope, pouch, crate, pallet, bin, cylinder, box, carton, bag, can, etc.) for storing at least one item (e.g., an item of merchandise), an electronic (e.g., radio frequency identification (RFID)) module associated with the container, and a controller which wirelessly communicates with the module, for directing a transfer of the item(s) to and from the container.

The inventive warehousing system may also include a second container for receiving the item(s) from the first container. In this case the controller may also direct a transfer of the item(s) from the first container to the second container. In addition, the second container may be associated with a second electronic (e.g., RFID) module which wirelessly communicates with the controller, for facilitating a transfer of the item(s) from the first container to the second container.

More specifically, the electronic module may include a light emitting device which is activated to indicate that the item(s) should be transferred to and from the first container. The module may also include a display device for indicating a content of the container (e.g., first container).

In another aspect, the present invention includes a hybrid retail/warehouse system which includes a retail/warehouse facility including a shelving area, and a picking area adjacent to said shelving area, and having a layout so as to minimize a picking area and a walking distance between a picking area and a shelving area. The system also includes a container associated with the retail/warehouse facility for storing at least one item (e.g., item of merchandise) an electronic (e.g., RFID) module associated with the container, and a controller which wirelessly communicates with the module, for directing a transfer of the item(s) to and from the container.

Further, the retail/warehouse facility may store item which is personally selected by in-store customers and remotely selected by out-of-store (e.g., Internet) customers.

In another aspect, a warehousing method according to the present invention includes storing at least one item in a container, and remotely directing a transfer of the item(s) to and from the container, using a electronic (e.g., Radio Frequency Identification Device (RFID) module) which is associated with the container. The inventive method may also include remotely assigning a bag (e.g., second container) to receive the item(s) from the container.

In another aspect, a hybrid retail/warehouse method according to the present invention includes storing at least one item in a container which is associated with a retail/warehouse facility, the facility including a shelving area, and a picking area adjacent to said shelving area, and having a layout so as to minimize a picking area and a walking distance between a picking area and a shelving area. The method also includes remotely directing a transfer of the item(s) to and from the container, using an electronic (e.g., RFID) module which is associated with the container. Further, the item may be personally selected by in-store customers and/or remotely selected by out-of-store customers.

The present invention may also include a signal-bearing media tangibly embodying a program of machine-readable instructions executable by a digital data processor to perform the inventive warehousing method (e.g., hybrid retail/warehousing method).

Further, in the present invention, the container may include a box, pallet, plastic package, or bag, etc. Further, the container may store (e.g., house) a single item.

In addition, the controller can wirelessly communicate with the first electronic module via a low frequency signal (e.g., radio frequency signal).

In another aspect, the present invention includes a pallet for storing an item, the pallet includes a body which contains the item, and an electronic identification module attached to the body.

In another aspect, the present invention includes a package for storing an item. The package includes a body which contains the item, and an electronic identification module attached to the body.

Further, in the present invention the electronic module (e.g., the first electronic module) may include an antenna for facilitating the communication with the controller. The antenna may be small or large relative to the size of the container. Specifically, the antenna may be large and may be formed on at least one side of the container.

Further, the electronic module (e.g., first electronic module) may be integrally formed with the container (e.g., first container). That is, the entire body of the container may be available for including features of the electronic module. For example, if the container is a plastic package having 6 sides (e.g., a tetrahedron-shaped package) the antenna may be integrally formed (e.g., embedded in) on one or more of the six sides of the package.

In another aspect, the present invention includes a container for containing an item. The container includes a body which contains the item, and an electronic module integrally formed with (e.g., embedded in) the body. For example, as noted above, the body may include an antenna coupled to the electronic module for facilitating wireless communication with the electronic module. For example, the body may include a plurality of sides, the antenna being integrally formed with at least one of the plurality of sides. For example, the antenna may be integrally formed with all of the plurality of sides.

In another aspect, the present invention includes a package for containing an item. The package includes a body which contains the item, and an electronic module integrally formed with the body.

In another aspect, the present invention includes a pallet for containing an item. The pallet includes a body which contains the item, and an electronic module integrally formed with the body.

With its unique and novel features, the present invention optimizes each employee's time and leads to highly efficient put away of products and highly efficient picking of products. The invention, therefore, offers affordable, state-of-the-art technology for managing and improving retail and warehouse operations. The inventive system and method may also be conveniently offered as an independent or integrated solution to supply chain needs.

BRIEF DESCRIPTION OF THE DRAWINGS

The foregoing and other purposes, aspects and advantages will be better understood from the following detailed description of a preferred embodiment of the invention with reference to the drawings, in which:

FIG. 10 illustrates a typical hardware configuration which may be used for implementing the system and method according to the present invention;

FIG. 11 illustrates an example of a signal-bearing media which may be used to implement the system and method according to the present invention;

DETAILED DESCRIPTION OF PREFERRED EMBODIMENTS OF THE INVENTION

Figure 1:
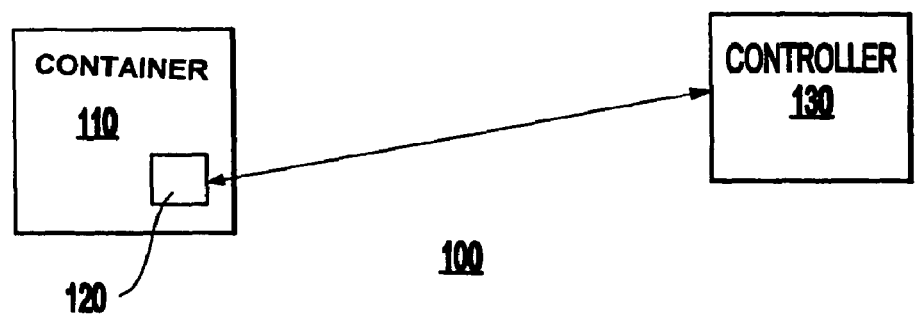
FIG. 1 is a schematic drawing illustrating an inventive warehousing system 100.

Referring now to the drawings, and more particularly to FIGS. 1-13, there are shown preferred embodiments of the system and method according to the present invention.

As shown in FIG. 1, an inventive warehousing system 100 includes a container (e.g., tote, package, packet, wrapper, envelope, pouch, crate, pallet, bin, cylinder, box, carton, bag, can, etc.) 110 for storing at least one item of merchandise, an electronic (e.g., first radio frequency identification (RFID)) module 120 which is associated with the first container, and a controller 130 which wirelessly communicates with the module, for directing a transfer of the item(s) to and from the first container.

The inventive warehousing system 100 is especially useful for storing an item (e.g., one or more items) in a container. The system 100 may be especially efficient for warehousing (e.g., storing) items having an expiry date. For example, in the inventive system, a medical device (e.g., a single medical device) such as a heart valve, stent or shunt may be stored in a package (e.g., container).

As described below, the inventive system 100 optimizes each employee's time and leads to highly efficient "put away" (e.g., shelving) of items and highly efficient "picking" of items. The inventive system 100 is based in part on a wireless container system that may use display modules and short range low frequency RF transmitted through loop antennas similar to those used for grocery store pricing modules.

Figure 2A:
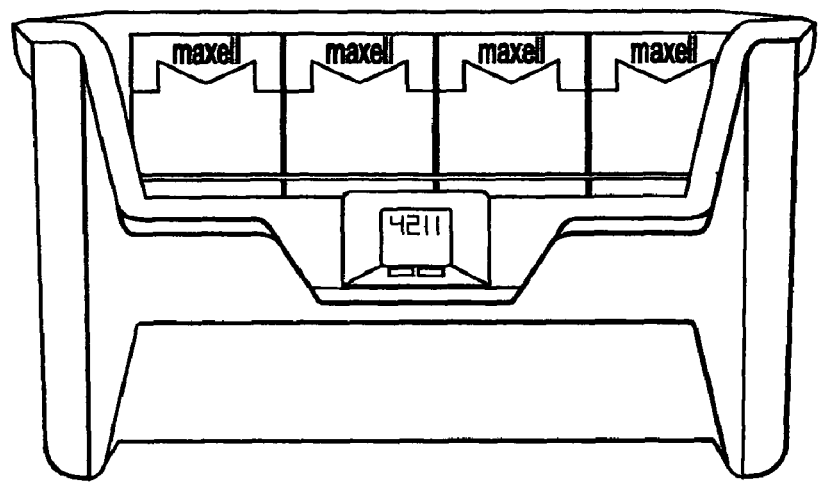
FIG. 2A-2B illustrate a container that may be used in the inventive system 100 according to the present invention.
Figure 2B:
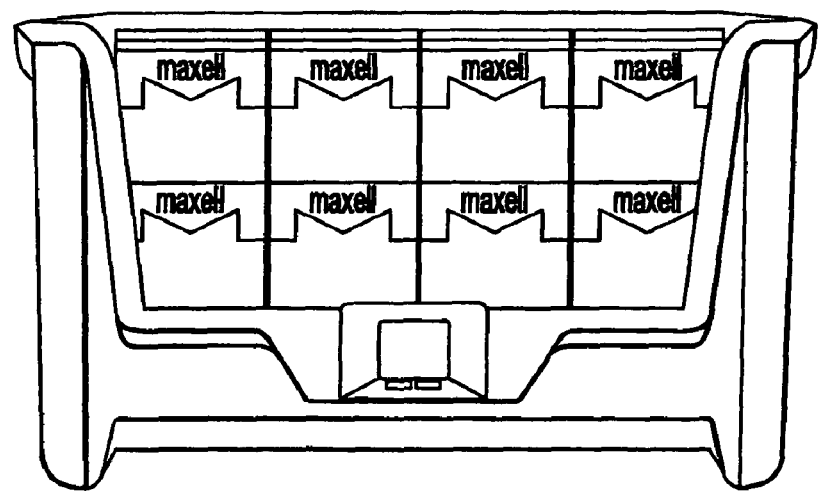

In addition, as shown in FIGS. 2A-2B, the container 110 may include a tote for easily transferring items to and from the container.

The container 110 used in the inventive system 100 may be formed of varying dimensions and may be used to store several items. For example, the container 110 may be small enough to hold bolts and spices, or large enough to hold 50 lb bags of dog food. In fact, for very large items the container 110 may resemble a pallet in a pallet-based system.

Figure 2C:
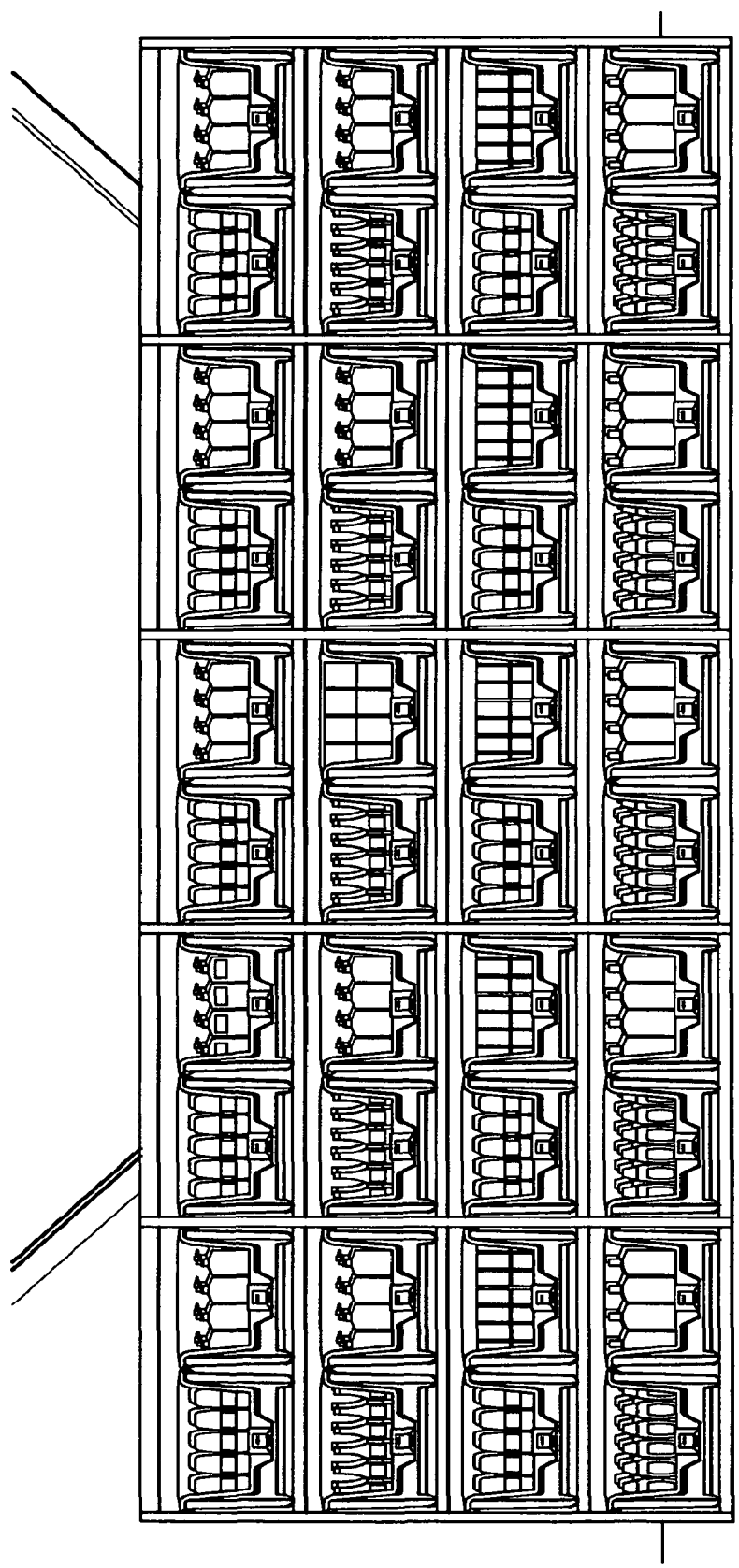
FIG. 2C-2D illustrate examples of how containers may be arranged on shelves according to the present invention.
Figure 2D:
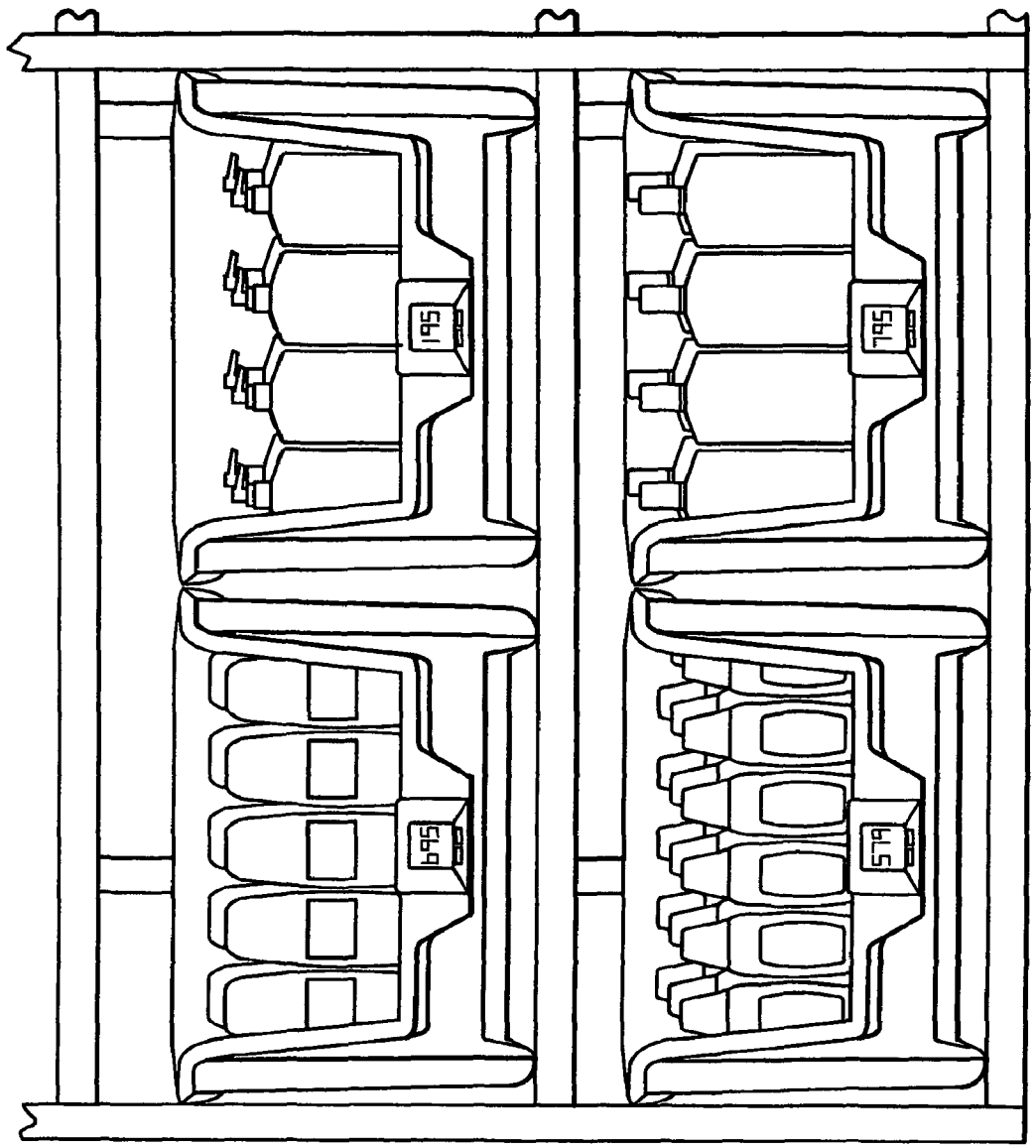

For instance, the container 110 may have suitable dimensions (e.g., approximately 18"×18" by 24" in an exemplary non-limiting embodiment) and may be made from conventional materials (e.g., plastic). The container 110 may be smaller or larger, and a warehouse may use a plurality of containers 110 having a variety of sizes. In addition, as shown in FIGS. 2C-2D, the container 110 may be easily stored on store shelves to provide for a very neat and organized presentation of the items.

Figure 3A:
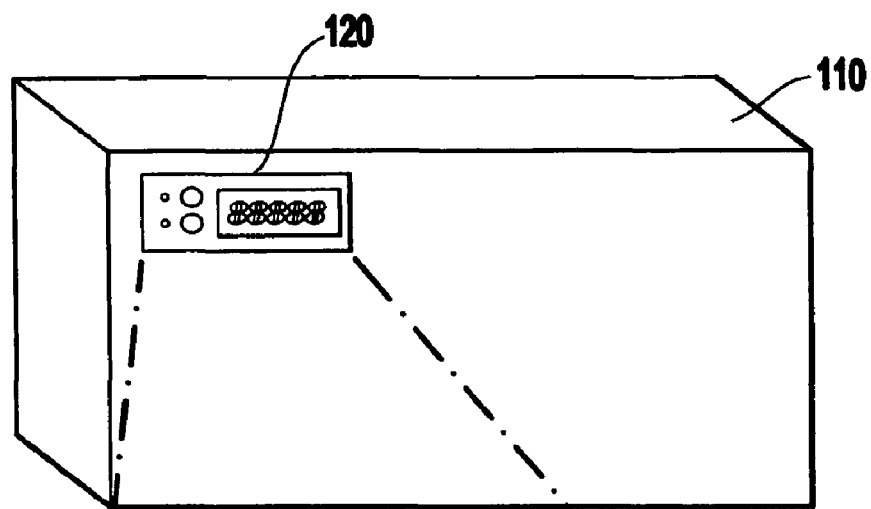
FIG. 3A provides a detailed illustration of a container which may be used in the inventive system 100.

In addition, as shown in FIG. 3A, associated with each container is an electronic module 120 (e.g., radio frequency identification module (RFID)). For example, the electronic module 120 may be affixed (e.g., attached) to the container 110. More specifically, the module 120 may be a wireless battery operated module capable of two-way communication.

Figure 3B:
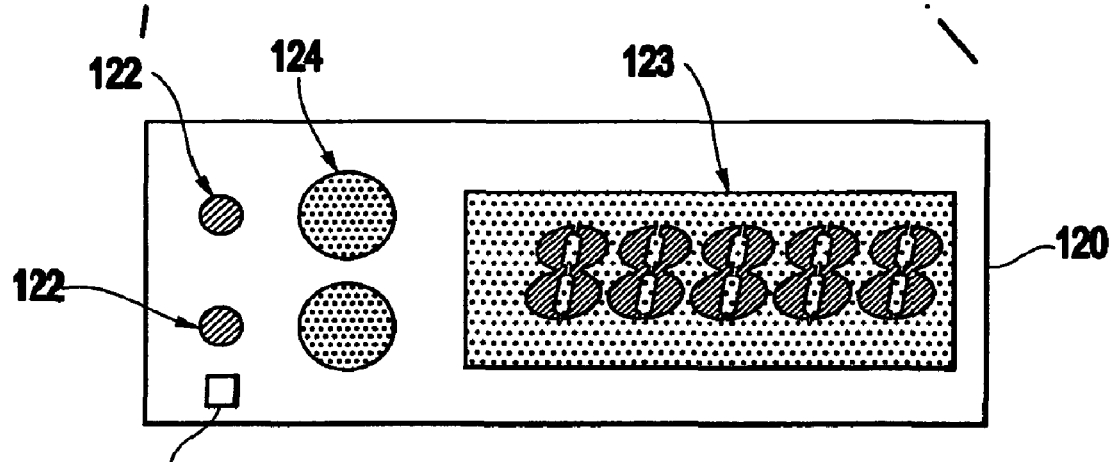
FIG. 3B illustrates an electronic module which may be associated with a container in the inventive system 100.

As shown in FIG. 3B, each module 120 may include a memory device 121 (e.g., semiconductor memory; random access memory (RAM) for storing a unique identification (ID) number, two light emitting devices 122 (e.g., light emitting diodes (LEDs)) which may have different colors (e.g., red and green), a display device 123 (e.g., liquid crystal display (LCD)) which may include a five-digit display, and at least one device 124 (e.g., button) for activating/deactivating a feature of the module 110 (e.g., the LED, display device, etc.).

Of course, many variations of the module 120 configuration are possible. The module 120 may use a low power complementary metal oxide semiconductor (CMOS) circuitry and, with a standard lithium battery, will operate for a period of many years. The memory device 121 may also store button pushes or other parameters associated with the status of the container (e.g., weight, temperature, etc.). The memory device 121 may also store identification numbers (e.g., UPC) corresponding to items which are contained in the container 110 or which are to be transferred to or from the container 110.

The inventive warehousing system 100 also includes a controller 130 which wirelessly communicates with the module 120. The controller 130 directs a transfer of the item(s) to and from the container 110.

For example, the controller 130 may include a processor (e.g., microprocessor), memory device and two way radio device (e.g., transmitter/receiver). For instance, the controller 130 may include a computer system which is capable of directing a radio transmitting/receiving function. For instance, the controller 130 may wirelessly communicate with the module 120 using low frequency (e.g., 300 khz) two-way radio frequencies.

The inventive warehousing system 100 may also include an antenna (e.g., antennas) (not shown) to facilitate communication between the controller 130 and the module 120. The antenna may include one or more antenna loops (e.g., wire loops) and communication may be limited to the area within a loop. These antenna loops can be placed in the floor, behind a shelf or in the ceiling.

Thus, when a given loop is activated, it can poll for a specific module 120 and if the module 120 is present, it can be made to respond to the poll. In other words the controller 110 (e.g., a software system operated by the controller 130) can direct a search of the entire warehouse, loop by loop polling for a specific module 110, and locate the presence or absence of a module 120. When the software system establishes communication, the inventive warehousing system 100 can because the module's display device 123 to display a particular number, read whether a particular button 124 has been pushed or not, turn an LED 122 (e.g., red, green, etc.) on or off, read back the identification number of the module 120, read the contents of the memory device 121, etc.

Figure 4A:
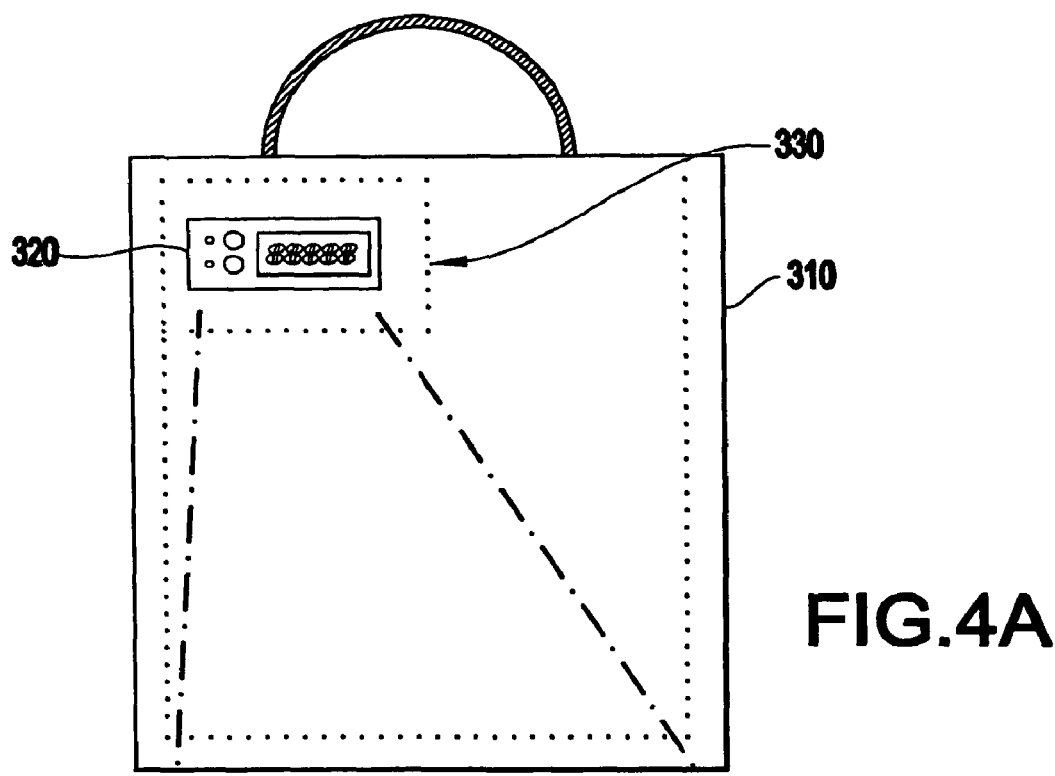
FIG. 4A provides a detailed illustration of a smart bag (e.g., container) which may be used in the inventive system 100.

As shown in FIG. 4A, the inventive warehousing system 100 may also include a smart bag 310 for receiving items from the container 110. Generally, the features described above for the container 110 can also be provided by the smart bag 310. For example, the smart bag 310 may be made of conventional materials, such as plastic or canvas.

Figure 4B:
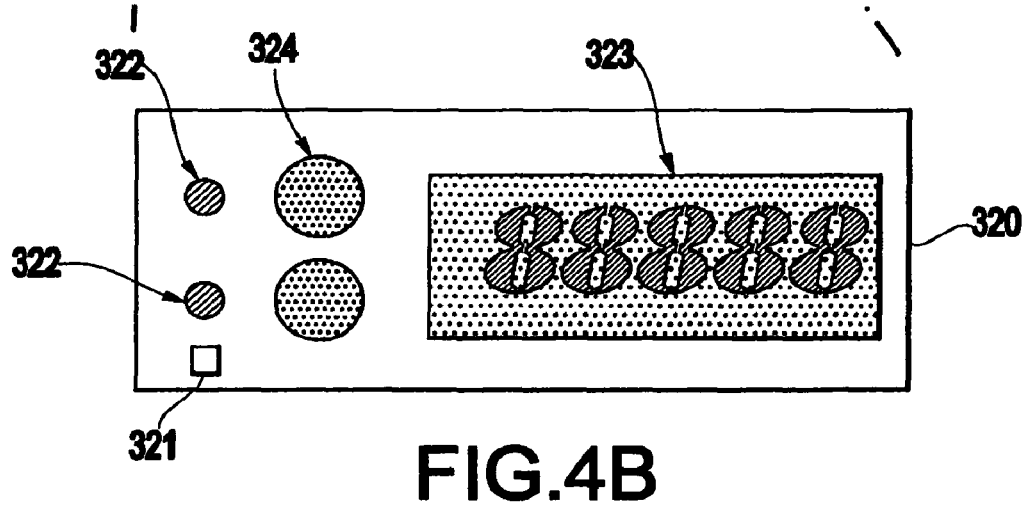
FIG. 4B illustrates an electronic module which may be associated with a smart bag in the inventive system 100.

Further, as shown in FIG. 4B, the smart bag 310 may also be associated with an electronic module 320 similar to the module 110 discussed above. For instance, the module 320 may include a memory device 321 (e.g., semiconductor memory; random access memory (RAM) for storing a unique identification (ID) number, two light emitting devices 322 (e.g., light emitting diodes (LEDs)) which may have different colors (e.g., red and green), a display device 323 (e.g., liquid crystal display (LCD)) which may include a five-digit display, and at least one device 324 (e.g., button) for activating/deactivating a feature of the module 320 (e.g., the LED, display device, etc.).

Further, the module 320 may be affixed to the smart bag 310. For instance, the smart bag 300 may include a pocket 330 on the front of the bag 310 for containing the module 320. Further, the smart bag 310 may also contain an optional second bag (not shown) that can be used to hold products for delivery.

The inventive warehousing system 100 provides a fast and efficient tool for picking and putting away items and may be used in virtually any setting (e.g., retail, warehouse, hybrid retail/warehouse, etc.). For instance, FIGS. 5A and 5B illustrate examples of how the inventive warehousing system 100 may be implemented according to the present invention.

Figure 5A:
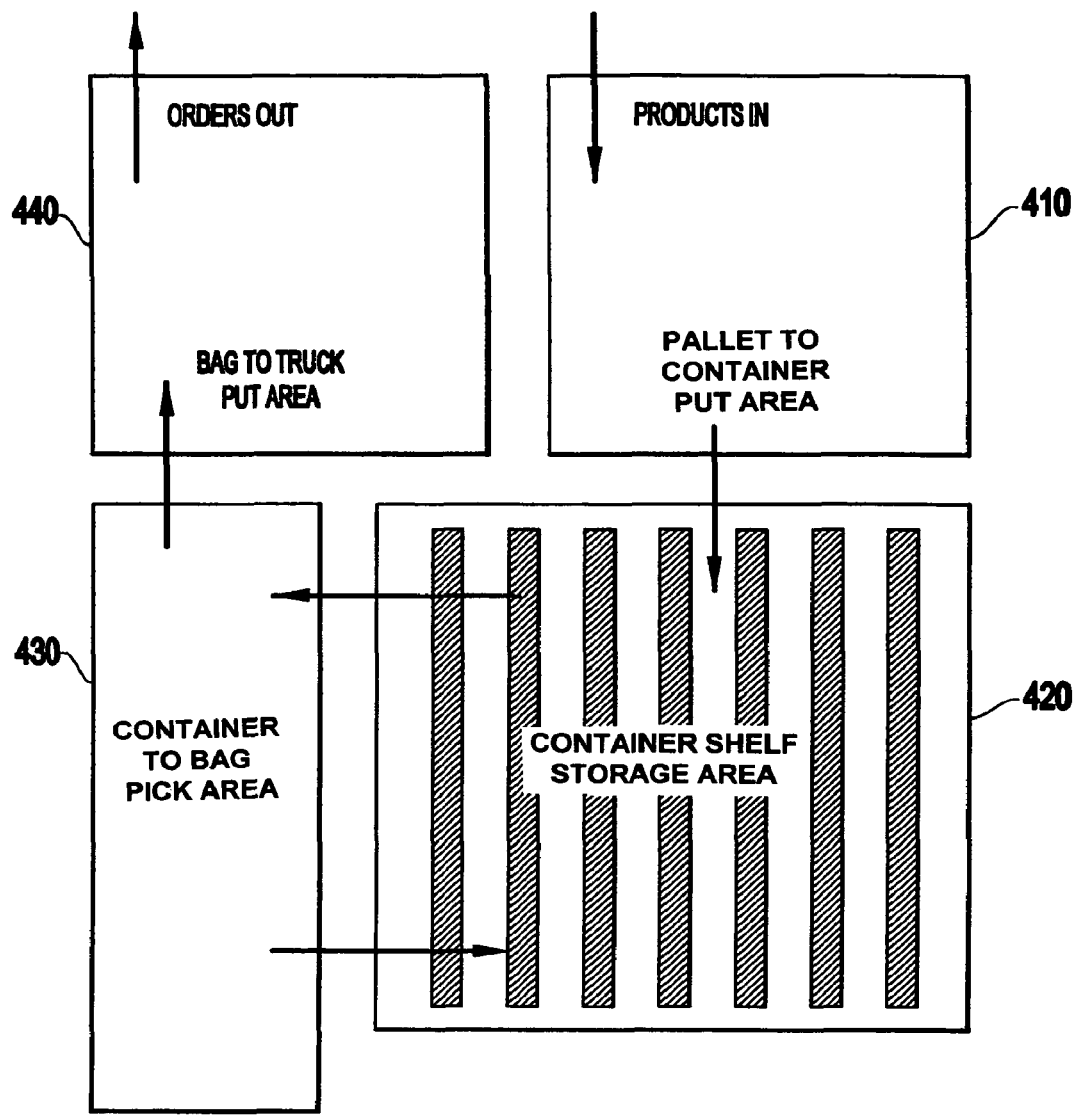
FIG. 5A-5B are schematic drawings illustrating a layout of an inventive warehousing system 100 according to the present invention.
Figure 5B:
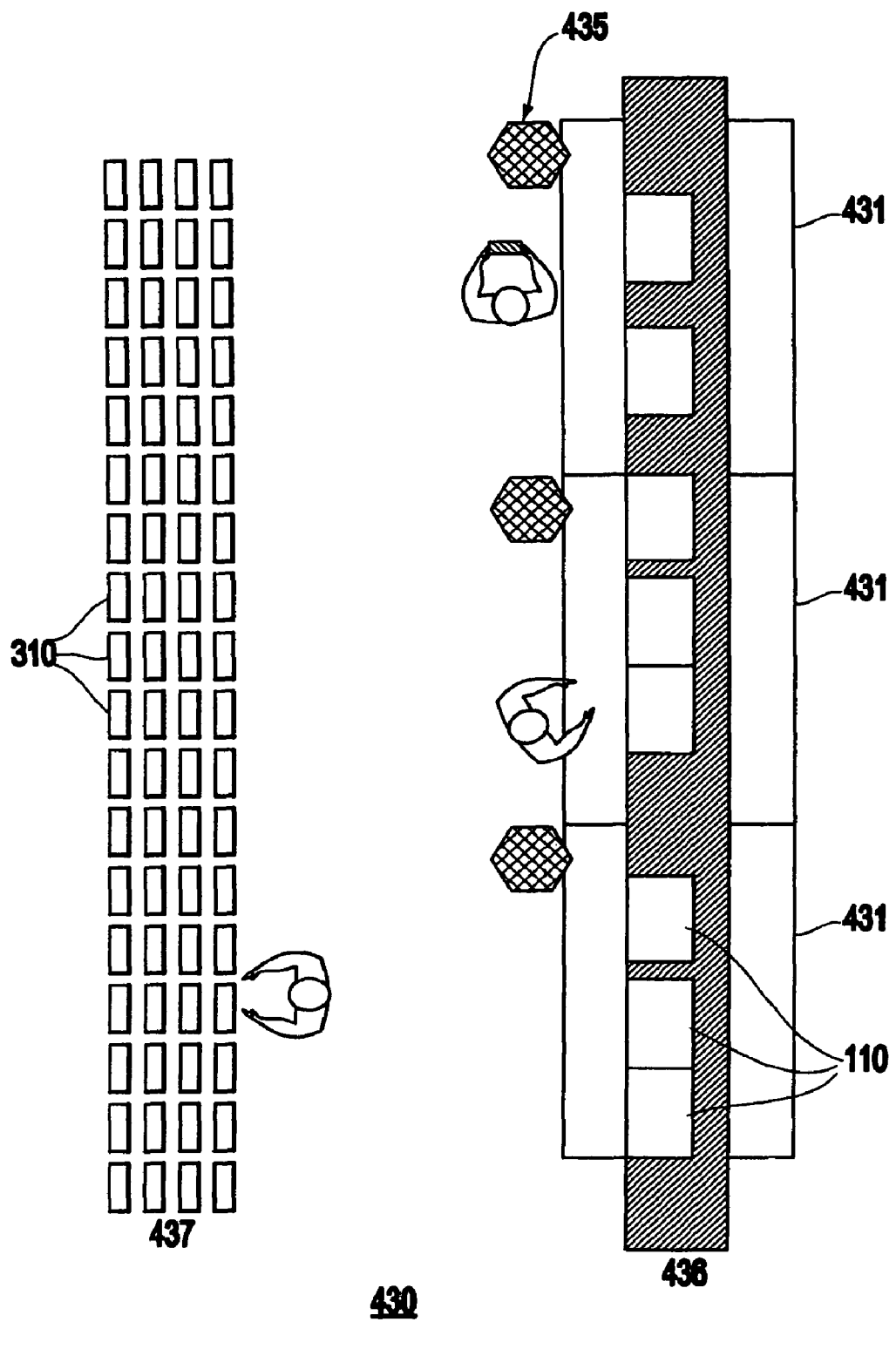

As shown in FIG. 5A, items may arrive at the facility (e.g., a warehouse) on pallets. As soon as the items are identified (from bar codes or the invoice), it may be moved to a "pallet to container put area" 410 (e.g., staging area). The number of containers 110 required to hold all of the product from the pallet may be calculated by the controller 130 (e.g., the system software), and the required number of containers 110 may be transferred into the put area 410 automatically.

A database (e.g., controller database) links the unique identification number of each container 110 with the item and the number of items that should be placed in the container 110. The pallet may be manually unpacked item by item and placed in the containers 110. Each container 110 may be weighed as a cross-check that the number of items are correctly packed into the container 110.

Referring again to FIG. 5A, the packed containers 100 may be moved into the shelf storage area 420 using, for example, a conveyor or truck. Each container 110 may be placed on the shelf in whatever order and in any available place the worker might find empty. For example, the containers 100 may be placed randomly on shelves. Further, the shelves may contain many thousands of containers 100 on shelves.

The controller 130 may communicate with a module 120 on a particular container 110 to indicate that an item contained in that particular container 110 is to be transferred. For instance, the controller 130 may cause the module 120 to activate an LED 122 which can be seen by operator to indicate that an item is to be transferred from that particular container 110. (It should be noted that the module 120 may include an audible signal (e.g., bell) instead of the LED 122 as an indicating device).

The container 110 indicated by the controller 130 may be transferred (e.g., by an operator or automatically) from the shelf storage area 420 to a container to bag pick area 430. Here, the item may be transferred from the container 110, for example, for delivery to a purchaser. For example, the item may be transferred from the container 110 to a smart bag 310. The smart bag 310 containing the item may be transferred from the container to bag pick area 430 to a bag to truck put area 440 to await transfer out of the facility.

Specifically, FIG. 5B provides a detailed illustration of a container to bag pick area 430. As shown in FIG. 4B, the picking area 430 may include a conveyor lane 436 and a picking lane 437.

When an operator (e.g., a "shelf picker") sees a light flashing on a container 110 in the shelf storage area 420, he may remove the container 110 from the shelf and place it in a conveyor lane 436 (e.g., conveyor belt) that takes it to a picking area 430. As the container 110 moves to the picking area 430, the red LED is turned off. The container 110 arrives at the picking area 430 and goes past several picking regions 431 until it comes to the region that has a bag 310 assigned to the order.

When that particular container 110 reaches that region 431, the controller 130 (e.g., software) causes the red light on the module 120 on that particular container 110 to activate again. The "packing picker" sees the light flashing an removes the item from the container 110.

The operator may scan the item removed from the container 110 using a scanner 435 provided in the picking area 430. The controller 130 (e.g., software system) detects that the correct item has been scanned and turns off the container's LED.

The operator may transfer the item to the picking lane 437 where smart bags 310 may be assembled. The controller 130 may (e.g., simultaneously with deactivating the container LED) activate an LED on a smart bag 310 in the picking lane 437 that is supposed to receive the item. The packing picker may place the item in the bag 310 that is flashing.

The picking area 430 may also contain a weight detection device (not shown) which allows the smart bag 310 to be weighed so as to detect a change in the weight of the smart bag 310 when an item is placed in the smart bag 310. For instance, when a predetermined weight change is detected, the LED on that particular smart bag 310 may be deactivated (e.g., by the weighing device or by the controller 130 which communicates with the weighing device).

After the item has been removed from the container 110, the container 110 may continue on the conveyor belt and eventually return to the shelf storage area 420. As the container 110 moves towards the shelf storage area 420 the controller 130 may activate an LED on the container module 120 (e.g., the green LED) to indicate that the container 110 should be placed back on the shelf. When the shelf picker may see the green flashing light on the container 110 and remove the container 110 from the conveyor and place it back on the shelf (e.g., in a random order).

Thus, for example, the shelf picker may simply pick red light containers and place them on the conveyor towards the picking area, and green flashing containers and put them back on the shelves. Therefore, the packing pickers may, for example, work within their region in the packing area 430 and simply take items from a red flashing container in the conveyor lane 436, scan it and place it in the bag 310 that has a flashing light in the picking lane 437. A container 110, the items in which have not been picked, may simply stay on the conveyor belt to return to the picking regions 431. It may also be possible to keep high volume items (e.g., items that are frequently picked) on a special conveyor behind the pick lane 437 so that they may be easily moved to the pick lane.

Hybrid Retail/Warehouse Facility

The inventive warehousing system and method may be efficiently and effectively incorporated, for example, in a hybrid retail/warehouse system.

Figure 6:
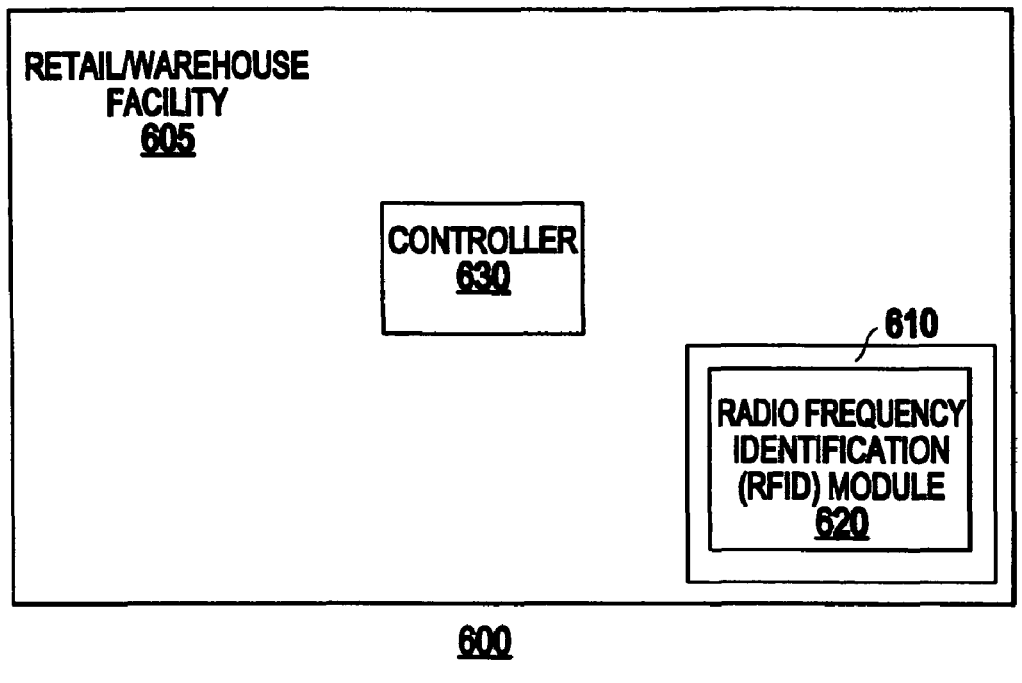
FIG. 6 illustrates an inventive hybrid retail/warehouse system 100 according to the present invention.

As shown in FIG. 6, an inventive hybrid retail/warehouse system 600 includes a retail/warehouse facility 605 for storing items (e.g., items of merchandise). The retail/warehouse facility 605 may store items which may be either personally selected by in-store customers and/or remotely selected by out-of-store customers. For example, the retail/warehouse facility 605 may be designed to handle both retail customers who are shopping in person and personally taking items from the shelves for purchasing. However, the facility 605 may also be designed to handle customers that are remotely purchasing items such as over the Internet (e.g., the World Wide Web). Thus, the facility 605 may be equipped to conveniently take orders over the Internet.

The inventive hybrid retail/warehouse system 600 also includes a container 610 associated with the retail/warehouse facility 605 for storing at least one item, an electronic module 620 (e.g., a radio frequency identification (RFID) module) associated with the container 610, and a controller 630 which wirelessly communicates with the module 620, for directing a transfer an item to and from the container 610.

Specifically, the container 610, electronic module 620 and controller 630 may have features comparable to those discussed above with respect to the container 110, electronic module 120 and controller 130 in the warehousing system 100 above. In addition, the operation of the inventive hybrid retail/warehouse system 600 is comparable to the operation of the warehousing system 100 explained above with respect to FIGS. 5A-5B.

In short, the inventive system 600 provides a highly efficient, low capital cost solution that also can be easily scaled with throughput growth at low costs. The cost-effective scalability feature makes the inventive system 600 an attractive component in the Corporate Network product. Further, the inventive system 600 is ideally suited to serve uncertain inventory requirements. The system 600 can serve the full range and be quickly retrofitted at a low cost to increase productivity or be used as a simple pick-to-light in aisle system.

In other words, the inventive system 600 provides an inventive "new economy" fulfillment channel, that can save as much as 50% in regional fulfillment costs. The inventive channel may be based, for example, on optimized un-attended night-time delivery to a network of proprietary, secure drop boxes.

The inventive system 600 may be used, for example, for business-to-business (B2B) corporate fulfillment (e.g., critical parts, industry specific networks, wholesale fulfillment, and private corporate networks). However, the inventors believe retail fulfillment also offers a significant opportunity and can also benefit from the inventive system 600 and its related technology.

Unlike conventional systems, the inventive hybrid retail/warehouse system 600 provides optimized high throughput for each picking. The inventive system 600 relies in part on the electronic module 620 associated with the container 610. However, unlike many radio frequency (RF) tag devices in conventional systems (and comparable to the features discussed above with respect to module 120) the module 620 may include: two LEDs, an 8 Digit LCD, three operating switches (e.g., activating/deactivating buttons), a two way 300 Khz 1200 baud RF link, programmable functionality, and a prepro-grammed unique identification (e.g., ID number).

Further, each module 620 may be used to display retail price and unit price, in addition to displaying all other warehouse functions on demand for in-store pickers, including pick-to-light LEDs.

Referring again to FIG. 6, the controller 630 wirelessly communicates with the RFID module 620, in order to identify and locate items. It should be noted that FIG. 6 is merely illustrative and that the controller 630 may be located within or outside the facility 605. Likewise, the RFID module may be located either inside or outside the facility 605 and still be controlled by the controller 630.

The inventive system 600 provides a low-cost, small-footprint pick-to-light fulfillment system that can use the controller 630 to "find" an item in a warehouse (e.g., a hybrid retail/warehouse facility 605). Using a unique Radio Frequency Identification (RFID) module, the controller 630 allows random, dynamic placement of inventory for either pick or put-away. The controller 630 can "find" and recognize the location of any randomly placed inventory with periodic scans of the warehouse.

In addition, inventive system 600 is very flexible. Its installation can be configured to as low as 2,000 containers or modules, yet there is no practical limit on the size of facility or number of SKUs.

The inventive system 600 further provides a wireless, real-time fulfillment system using pick-to-light (PTL) and RFID technology which may be coupled with a proprietary inventory location and positioning software which may be executed, for example, by the controller 630. The controller 630 allows for the identification and placement of inventory anywhere in the warehouse without the rigid structures of predetermined inventory locations or addresses.

Further, the proprietary wireless display module 620 is designed so as to allow the central controller 630 to selectively "talk" to the module 620 when it is located anywhere in or around the warehouse facility 605. In addition, the modules 620 can be attached to any inventory unit (e.g., each/container/tote/pallet, etc.). Once an SKU is identified to the module 620, an item may be placed anywhere in or around the facility 605 and the controller 630 will "locate" it.

Further, the inventive system 600 is configurable to any warehouse operation. Its basic functionality may include, for example, receiving, dynamic or traditional addressed put-away, dynamic picking, packing, shipping, cross docking, productivity measurement, labor management, dynamic slotting, re-warehousing (storage consolidation), RF communications for all functions, automatic replenishment, expiration dating, batch/lot control, report generation, order management, wave management, weight check, cycle counting

Comparative Examples

Figure 7A:
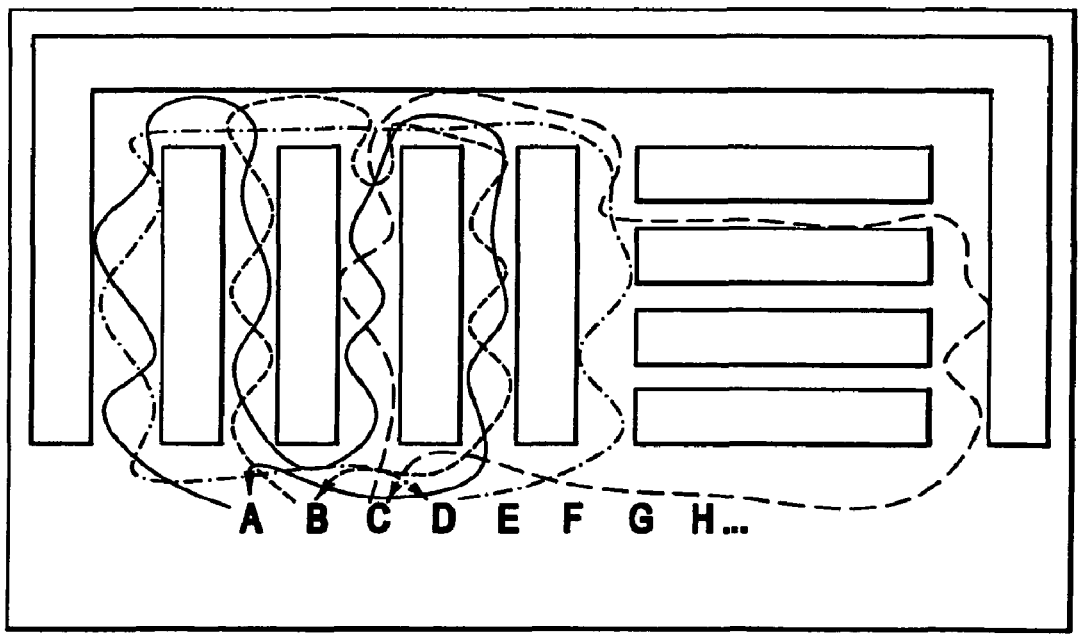
FIG. 7A illustrates a conventional warehouse system.
Figure 7B:
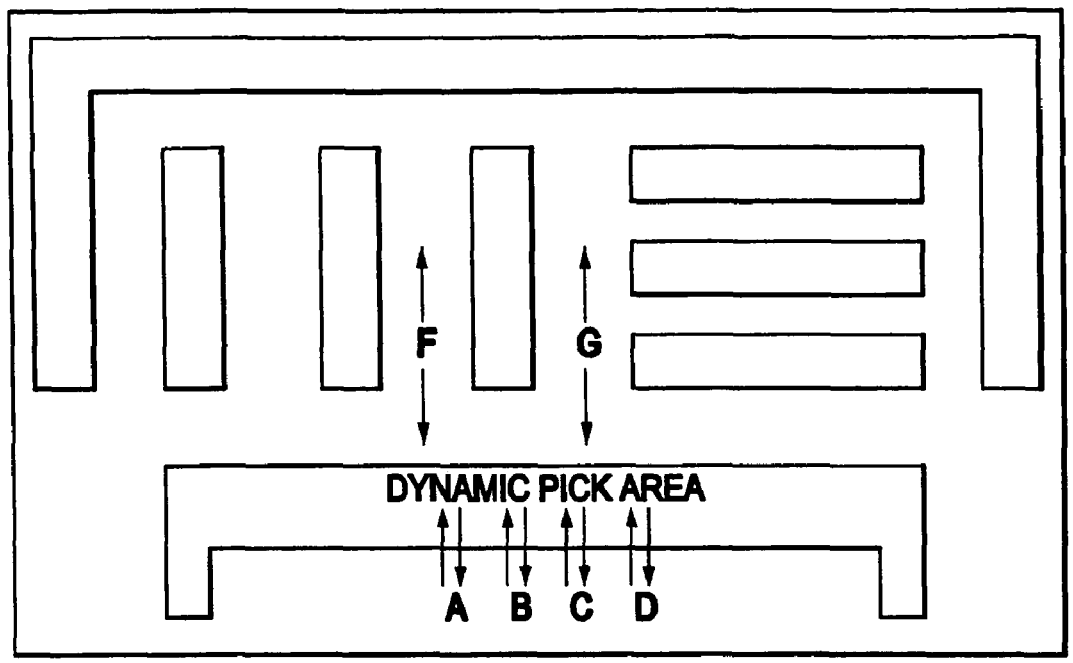
FIG. 7B illustrates a comparably-sized warehouse utilizing the inventive hybrid retail/warehouse system 600.

FIG. 7A illustrates a conventional warehouse system, and FIG. 7B illustrates a comparably-sized warehouse utilizing the inventive hybrid retail/warehouse system 600.

Specifically, FIG. 7A illustrates a conventional warehouse which may include, for example, a typical 250,000 sq.ft. distribution center (500'×500') in which all SKUs have location addresses assigned to them, either random or fixed. All locations within the facility are active, picking can occur throughout the facility. It is assumed that 20 pickers are required to pick 200 orders for this hypothetical operation.

Traditional pick-paths can span the entire warehouse to find the "B" and "C" items in a pick list.

It may be assumed, for example, that within such a conventional distribution operation, 75% of a picker's time will be spent traveling, and an average multi-pick order will require the picker to travel 60% of the total aisle distance within the picking area. In this case there are 7 aisles, 300 feet each; at 60% average order batch travel will be 1,260 feet and 200 batches will require travel of 252,000 feet per day (7 aisles×300 feet×60%×200 order batches). Assuming 20 pickers are required to fulfill, the average picker travel will be 12,600 feet per day. Therefore the standard output per picker is 12,600 feet per day.

FIG. 7B, on the other hand, illustrates a warehouse utilizing the inventive system 600 and which includes a Dynamic Pick Area A B C D F G. The inventive system 600 allows a much smaller pick area. In addition, a limited number of people locate the "B" and "C" containers and position them within the picking area.

Specifically, FIG. 7B illustrates a distribution center with 25,000 sq.ft. picking area, with 825 feet of aisles (11 aisles× 75 feet) and 225,000 sq.ft. for back stock. This methodology may require two (2) full-time replenishers. However, since the picking area is geographically smaller and travel distances are shorter, there will be fewer pickers required. Using the math from the first illustration: 200 order batches×(825× 60%)/12,600 feet/day/picker (performance standard)=8 pickers required. 8 pickers+2 replenishers=10 total headcount for a 10 headcount reduction. Paybacks of less than one year can be attained using the presently disclosed inventive system 600.

Figure 7C:
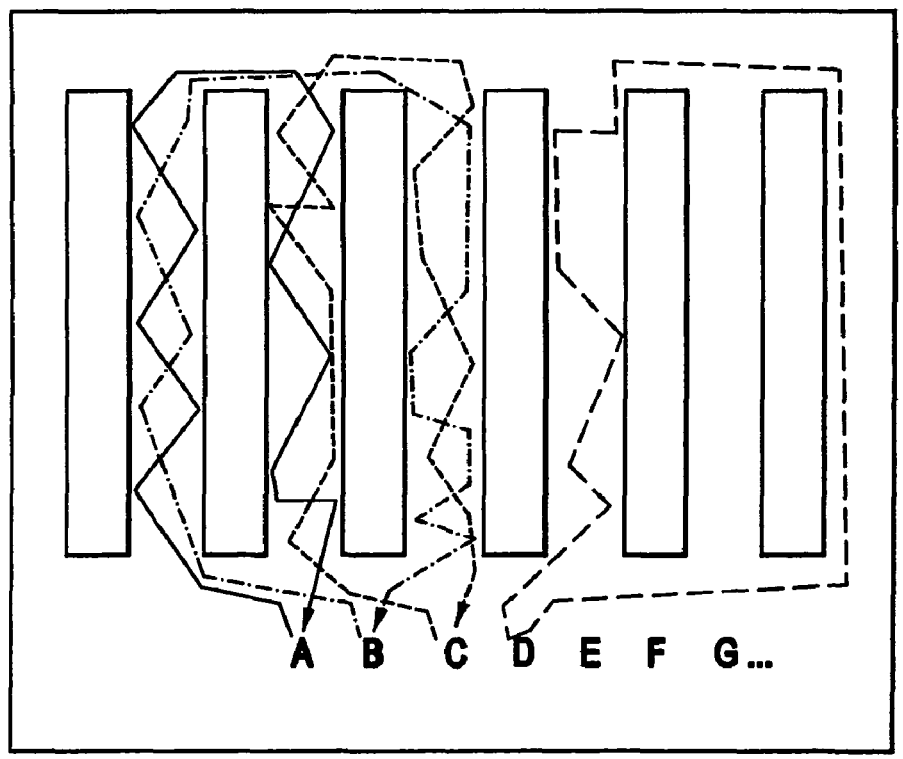
FIG. 7C illustrates a conventional warehouse system.
Figure 7D:
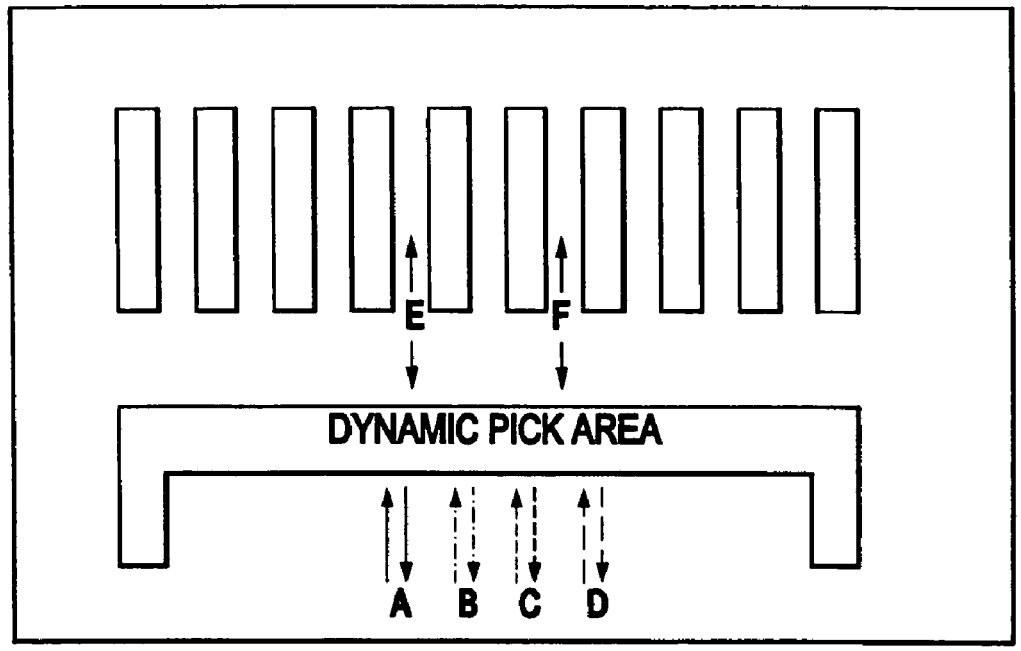
FIG. 7D illustrates a comparably-sized warehouse utilizing the inventive hybrid retail/warehouse system 600.

Referring again to the drawings, FIG. 7C illustrates a conventional warehouse system, and FIG. 7D illustrates a comparably-sized warehouse utilizing the inventive hybrid retail/warehouse system 600.

FIG. 7C illustrates second example of a conventional warehouse system A B C D E F G Y. As shown here, conventional pick-paths can span the entire warehouse to find the "B" and "C" items in a pick list.

Specifically, FIG. 7C illustrates a typical 250,000 sq.ft. distribution center (500'×5800') in which all SKUs have location addresses assigned to them, either random or fixed. All locations within the facility are active, picking can occur throughout the facility.

It may be assumed, for example, that 20 pickers are required to pick 200 orders for this hypothetical operation. It may also be assumed that, within distribution operations, 75% of a picker's time will be spent traveling, and an average multi-pick order will require the picker to travel 60% of the total aisle distance within the picking area.

In this case there are 7 aisles, 300 feet each; at 60% average order batch travel will be 1,260 feet and 200 batches will require travel of 252,000 feet per day (7 aisles×300 feet× 60%×200 order batches). Assuming 20 pickers are required to fulfill, the average picker travel will be 12,600 feet per day. Therefore the standard output per picker is 12,600 feet per day.

FIG. 7D, on the other hand, illustrates a facility using the inventive system 100 as applied to a picking operation. As shown in FIG. 7D, the inventive system 600 allows a much smaller pick area. A limited number of people locate the "B" and "C" containers and position them within the picking area (e.g., dynamic pick area A B C D E F.

Specifically, FIG. 7D illustrates the a distribution center with 25,000 sq.ft. picking area, with 825 feet of aisles (11 aisles×75 feet) and 225,000 sq.ft. for back stock. This methodology will require two (2) full-time replenishers, however since the picking area is geographically smaller and travel distances are shorter, there will be fewer pickers required. Using the math from the first illustration: 200 order batches× (825×60%)/12,600 feet/day/picker (performance standard)= 8 pickers required. 8 pickers+2 replenishers=10 total headcount for a 10 headcount reduction. Paybacks of less than one year can be attained using the inventive system 600.

This example, assumes, for instance, that each headcount=$15.00 US/hr including fringes, and that each headcount=2080 hours/year (no overtime). It also assumes a 250,000 sq.ft. warehouse cost at $4.00 US per sq.ft. $1,000,000 US inventory.

Therefore, the cost of the inventive system 600 may include installation w/20,000 containers $250,000, employee retraining 8 hrs H 20 HC 2,400, maintenance agreement (15%) 37,500, and contingency (10%) 25,000. Thus, the total cost is about $314,900.

In other words, the inventive system 600 results in savings over the conventional system. For instance, assuming a 10 headcount reduction (10 H $15 H 2080) $312,000, space utilization improvement 15% 50,000, and inventory utilization improvement 5% 50,000, the total savings is about $362,000.

Other Features

An important feature of the inventive system 600 is that location of items does not need to be assigned. All movement whether put-away, re-stocking, receiving or shipping can be random and dynamic. The controller 630 will locate the SKU, container, or pallet and update the system 600. All items within or around the facility 605 may be identified with modules 620 which are continuously interrogated by the controller 630 for quantity and physical location of the items.

This unique attribute is invaluable in fast paced, dynamic warehouse environments such as fashion, seasonal businesses, and service parts. The ability to dynamically slot picking areas allows the warehouse to keep a small picking footprint. The ability to dynamically consolidate put-away areas keeps those storage areas densified and opens empty slots for inbounds.

There are other important features of the inventive system 600 which make it more efficient than conventional systems. For example, the receipt process ties a single unit of product (each, container, pallet, etc) to a single module 620 which may be automatically tracked by the controller 630. Further, Received product is simply put into the next available picking or storage slot anywhere in the warehouse (e.g., dynamic put-away). The controller 630 takes care of the tracking. This user-friendly approach allows operators more freedom to manage the flow of inbound inventory.

In addition, the system 600 provides for dynamic picking. For instance, occasionally, a "B" item becomes an "A for a day" and these items can be moved forward in real-time by the pickers, while slower moving items "B for a day" can be moved back using the same methodology. The system 600 also provides for cross-docking. For instance, during the receiving process, the controller 630 will automatically identify product to be cross docked and will notify receiving personnel through the display on the module 620. The product is then directed to the appropriate packing or shipping area. The system 600 also helps to facilitate productivity measurement. That is, the controller 630 may contain productivity reporting capabilities and interface with all conventional warehouse productivity software.

The system 600 also provides for dynamic slotting. For example, as the velocity of products change, the controller 630 may direct the movement of product to specific aisles or slots. Replenishers may be directed to move fast movers to the front of the picking area, slower movers back, and "C" items will be removed to storage if there is no future picking requirement. It should be noted that there is no requirement to return the "C" item to a fixed address, because it can be replaced anywhere in storage and the controller 630 will find it. The controller 630 updates the new location of the product automatically, and directs pickers or replenishers to the "new" location.

Further, the system 600 provides for pick path optimization. Specifically, pickers and replenishers may be directed through the most efficient pick paths to optimize productivity (e.g., a picking area may be minimized and a walking distance between a shelving (e.g., storage) area and a picking area may be minimized).

The system 600 also facilitates re-warehousing (storage consolidation). In other words, partially depleted containers may be moved to half-container locations to densify the storage area. Again the controller 630 may automatically update the new location of the product.

Further, wireless (e.g., radio frequency) communications may be used for all functions, thereby providing for automatic replenishment. In other words, since the controller dynamically tracks the location and quantity of all products in the warehouse, replenishment signals may be triggered to keep the right product in the pick area, just in time.

The system 600 can be incorporated at receipt to so as to facilitate expiry dating. In other words, the controller 630 can be configured to "find" the oldest product to reduce expiry dating write-downs. The system 600 may also aide in batch/lot control. The system 600 is completely variable and operator controllable to assure that the right mix or match of products is sent to the right customer. Last in first out (LIFO), first in first out (FIFO), least costly first, most costly first, expired product flash, and more are available in the controller 630.

The system 600 also facilitates cycle counting. In other words, the system 600 is configurable to meet the audit requirements of any company. Pickers may transmit (e.g., directly transmit) inventory discrepancies or replenishers to the controller 630 to trigger full scale cycle counts by SKU, container, expiration date, batch, etc.

In addition, the inventive system 600 is consistent and compatible with many current warehouse operations and systems. This is a significant benefit to organizations that have invested heavily in a traditional warehouse management system (WMS) and desire to add the module 620 and controller 630 functionality to their existing systems.

Economic Analysis

The inventors carried out preliminary economic analysis and marketing interviews and concluded that a retail store which utilizes the inventive hybrid retail/warehouse system 600 will overcome the major disadvantages of value chain issues and in-store picking of items. The store would effectively be able to sell "two touch" items at a retail level.

Additionally, such retail stores with the inventive system 600 will have low costs associated with item shelf maintenance, and provide the consumer with a neat orderly appearance. Such stores would also have very low planogram requirements, product maintenance inventory management costs, and the ability to modify and re-set store layout in a matter of only a few hours. Such a store would also have many inventory maintenance advantages, and the ability to optimize pricing to consumers.

In addition, such stores using the inventive system 600 may overcome one of the major consumer objections to bulk discount stores, namely "that it costs too much to shop because your forced to buy in large quantities". In other words, a store using the inventive system 600 will permit the store to sell individual items at discount bulk prices, for both in-store and out-of-store (e.g., internet/catalog) sales.

Advantages

The advantages of the inventive system 600 over a conventional shelf-based system with a traditional warehouse management system (WMS) are numerous. For example, the system 600 provides for captive customers, and strong customer conversion. Most in-store customers would make use of Internet and visa-versa. The system 600 also makes it possible to sell individual items in-store at prices competitive to discount bulk in competition. This is considered a consumer barrier to current bulk stores. In addition, the system 600 provides strong economic and value chain justification.

Further, the containers provide enormous savings in software and systems complexity, and product handling and space management efficiencies. Totes have a long history of success in Europe, where many manufactures are required to deliver all back-door products packed in containers. The containers can also provide a neat orderly looking store.

In addition, the system 600 provides electronic pricing and price optimization which is essentially free, and has stand-alone economic advantages. Further, the electronic management of item location or planogram has a low cost and is easy to implement. Moreover, store re-set can be carried out at much lower cost. In addition, the software systems and product inventory management software in the system 600 are not complex compared to conventional in-store systems.

In addition, the modules 620 are relatively inexpensive (e.g., less than $5.00 per module). Further, the software used to manage item picks and inventory that replaces current warehouse management system (WMS) software is simple. This is at least in part because the system 600 may be based on containers not SKUs. Moreover, physical location of the items can be managed and detected by the software in the warehouse, and items can be re-set based on whatever optimization might be required.

By flashing light-emitting devices (e.g., light-emitting diodes (LEDs)) on items to be picked, the pick rates may be doubled, put costs reduced, inventory management simplified, particularly with same SKUs that have different cost basis or expiration dates. Furthermore, physical inventory is simple, warehouse re-sets can be carried in matter of only few hours, and item location in warehouse can be optimized on almost a daily basis.

Conventional paper based operations can retain their existing warehouse storage philosophy and simply implement the inventive system 600 in a picking area. This is an excellent use of capital and the inventive system's capabilities. Improving picking productivity by 20-40% will justify the capital expenditure for the system 600, due to the system's low investment. For instance, if a company employs 20 or more warehouse personnel, an improvement in performance of only 4-6 head-count will justify the cost of the system 600. In addition, the system 600 is expandable and scalable, allowing warehouse operations to grow with their expanding businesses and markets.

Further, documentation and support of the controller 630 may include operations manuals, training documentation and support, installation manual, installation technical support, technical help desk, and full release and documentation of the controller 630 source code. Maintenance agreements in one (1) to five (5) year increments may also be available at 15% of installation annually, which will include all upgrades and modifications.

In short, the inventive system 600 provides fast paced quickly changing distribution operations the accuracy and efficiency of a conventional pick-to-light system without the high cost and static positions of hard-wired displays.

Further, the open code structure allows the inventive system 600 to easily interface with existing legacy business systems, enterprise resource planning systems (ERP) or existing inventory/warehouse management systems.

Specifically, the modules 620 may include a proprietary design. Briefly, though, each module 120 may contain a custom communication chip. A typical warehouse utilizing the inventive system 600 may include, for example, approximately ten (10) base stations for communication, a central controller, and approximately 20,000 containers for a total cost of under $250,000 installed. This is relatively inexpensive, compared to conventional WMS and PTL which cost approximately $100 to $250 US per location.

Other benefits of the inventive system 600 may include: installation costs 50-75% below traditional WMS-based PTL systems, improved picker accuracy to 99%+, improved picker productivity of 20-40% compared to non PTL installations, Space reductions up to 25% due to more effective space utilization, dynamic ABC, dynamic storage consolidations, Inventory reductions due to improved accuracy, consolidation, real-time, and cross-dock capabilities, Operator accountability, Real-time transaction capture, Paperless warehouse environment, 24×7 customer service/help desk, and Installation support.

Figure 8:
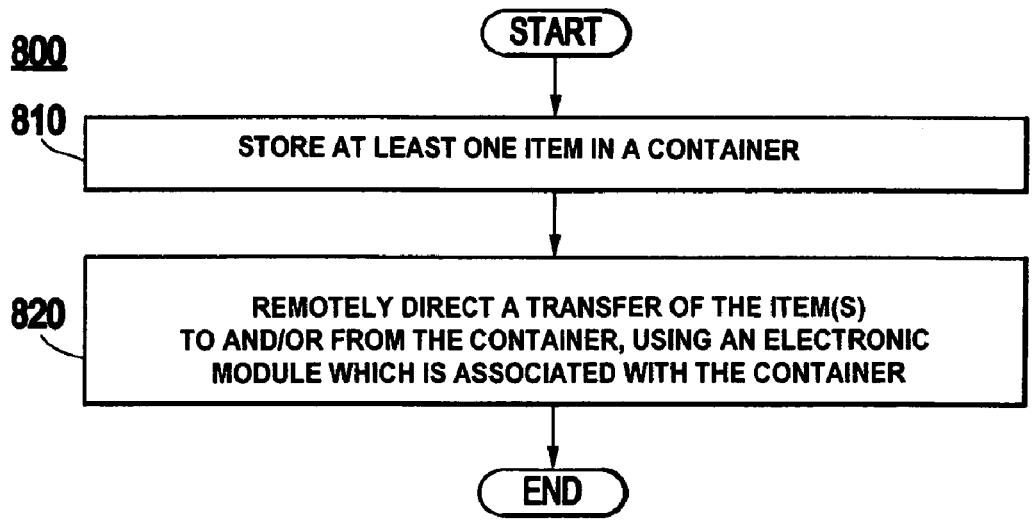
FIG. 8 is a flow chart illustrating an inventive warehousing method 800 according to the present invention.

Referring to FIG. 8, another aspect of the present invention includes an inventive warehousing method 800. As shown in FIG. 8, the inventive method includes storing (810) at least one item in a first container, and remotely directing (820) a transfer of the item(s) to and from the first container, using a Radio Frequency Identification Device which is associated with the first container.

Figure 9:
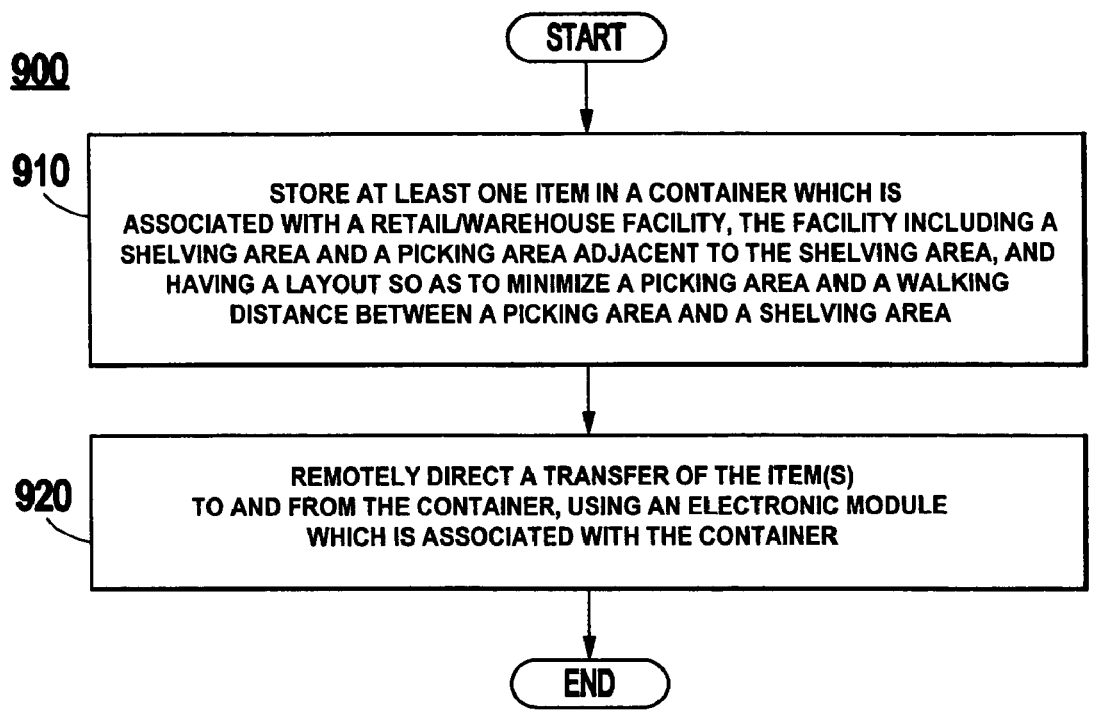
FIG. 9 illustrates an inventive hybrid retail/warehouse method 900 according to the present invention.

In addition, FIG. 9 is a flowchart an inventive hybrid retail/warehouse method 900. As shown in FIG. 9, the inventive method 900 includes storing (910) at least one item in a first container which is associated with a retail/warehouse facility, and remotely directing (920) a transfer of the item(s) to and from the first container, using a Radio Frequency Identification Device which is associated with the first container.

Referring again to the drawings, FIG. 10, illustrates a typical hardware configuration which may be used for implementing the inventive system 100, 600 and method 800, 900. The configuration has preferably at least one processor or central processing unit (CPU) 1011. The CPUs 1011 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communication adapter 1034 for connecting an information handling system to a data processing network, the Internet, and Intranet, a personal area network (PAN), etc., and a display adapter 1036 for connecting the bus 1012 to a display device 1038 and/or printer 1039. Further, an automated reader/scanner 1041 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 1011 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 1011 and hardware above, to perform the method of the invention.

This signal-bearing media may include, for example, a RAM contained within the CPU 1011, as represented by the fast-access storage for example. Alternatively, the instructions may be contained in another signal-bearing media, such as a magnetic data storage diskette 1100 (FIG. 11), directly or indirectly accessible by the CPU 1011.

Whether contained in the computer server/CPU 1011, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C," etc.

Further, it should be noted that the electronic tag may be considered to be associated not only with the container which contains items, but also with the item or items stored by (e.g., housed in) the container. For example, where the container includes a single item, the electronic tag (e.g., electronic module) which is affixed to (e.g., integrally formed with) the container may likewise be considered to be associated with the item stored in (e.g., housed by) the container.

Thus, information (e.g., an expiry date) associated with the item or items may be stored by the memory device included in the electronic module affixed to the container which houses the item or items.

Figure 12:
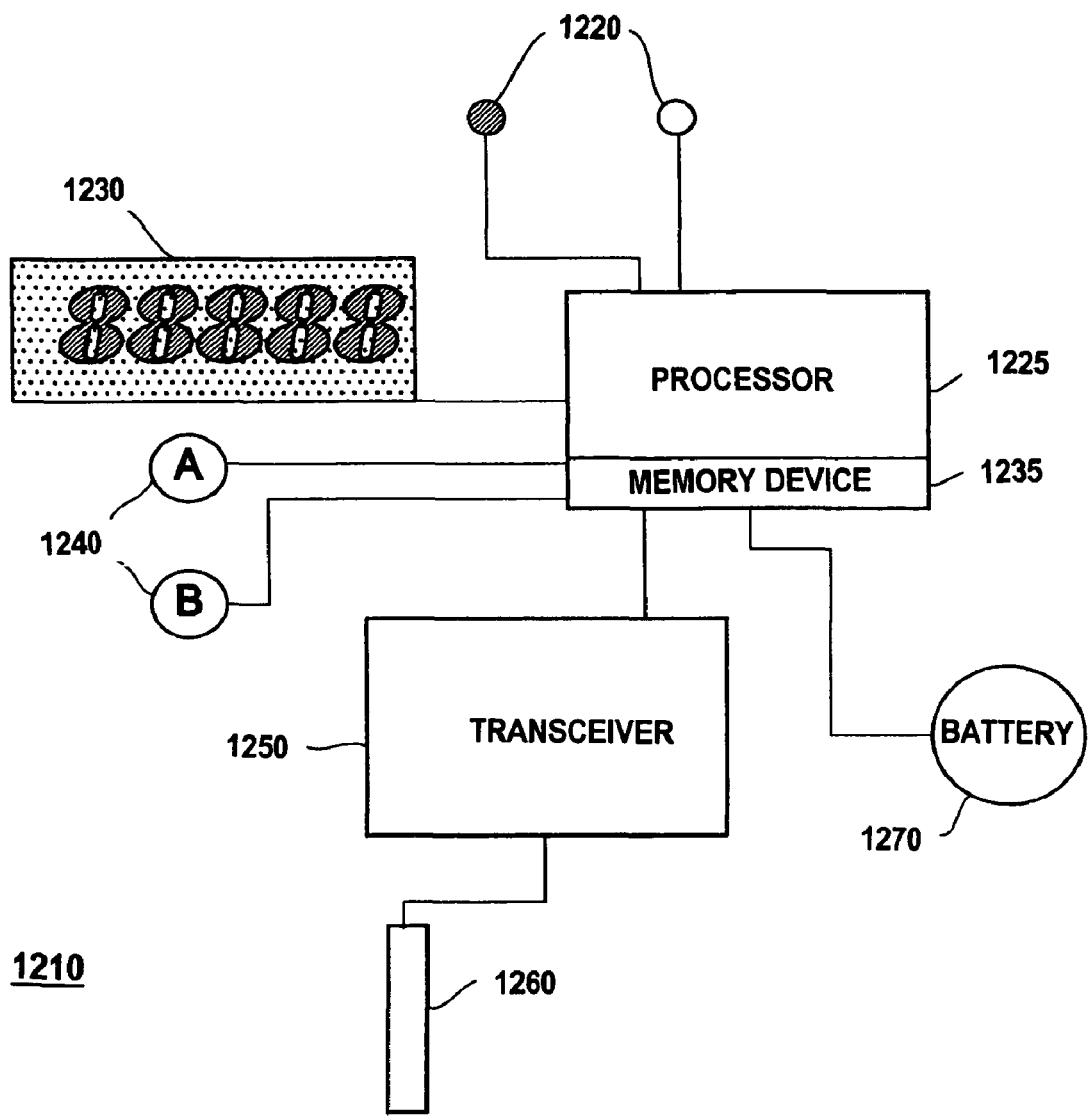
FIG. 12 illustrates the details of an electronic module which may be associated with a container in the inventive system 100.

Further, FIG. 12 illustrates the details of an electronic module which may be associated with a container or multiple items, or a single item (e.g., where a single item is included in the container) in the inventive system 100. As illustrated in FIG. 12, the electronic tag 1210 associated with the item may be affixed to a container or containers. As noted above, the container may include, for example, a tote, package, packet, wrapper, envelope, pouch, crate, pallet, bin, cylinder, box, carton, bag, can, etc. and may contain (e.g., store, house, etc.) a single item.

Further, the small electronic tag 1210 (e.g., electronic module) may be integrally formed with (e.g., embedded in a wall of) the container or may be affixed (e.g., adhered to) the container, for example, by locating the module, in a small translucent pocket on the container. The tag may include a signaling device (e.g., a plurality of signaling devices) such as a colored (e.g., red or green) light emitting device 1220 (e.g., a light emitting diode (LED) or an audible signaling device. The electronic tag 1210 may also include a liquid crystal display 1230 (LCD) for numeric or alphanumeric display, and a switch (e.g., plurality of switches or buttons) 340 for controlling an operation of the electronic tag 1210.

FIG. 12 provides a more detailed description of the electronic tag 1210. As shown in FIG. 12, the electronic tag 1210 additionally may include an inexpensive processor 1225 (e.g., a low powered four bit microprocessor), a memory device 1235 (e.g., a random access memory (RAM)) or other nonvolatile memory device for storing a unique identification number. The identification number may be permanent, so that it can be changed only with a special program and transmitter.

The electronic tag 1210 may also contain a transceiver 1250 (e.g., a transmitter/receiver such as a two-way communication chip) for allowing the electronic tag 1210 to communicate with a base station (e.g., controller). The two-way communications chip may be, for example, a lowcost CMOS analog digital chip. The chip may be connected to one or more orthogonal ferrite antennas 1260 that are able to transmit and receive signals using low frequencies (e.g., radio frequencies such as about 128 kHz) to a loop antenna which may be wirelessly connected to a base station (e.g., controller).

For example, antenna 1260 may be small or large relative to the size of the container. Specifically, the antenna 1260 may be large and may be formed on at least one side of the container.

Further, the electronic module 1210 may be integrally formed with the container. That is, the entire body of the container may be available for including features of the electronic module 1210. For example, if the container is a plastic package having 6 sides (e.g., a tetrahedron-shaped package) the antenna may be integrally formed (e.g., embedded in) on one or more of the six sides of the package.

For example, the container may include a body which contains the item, and an electronic module integrally formed with (e.g., embedded in) the body. In this case, the body may include an antenna coupled to the electronic module for facilitating wireless communication with the electronic module. For example, the body may include a plurality of sides, the antenna being integrally formed with at least one of the plurality of sides. Specifically, the antenna may be integrally formed with all of the plurality of sides.

Further, the loop antenna (e.g., antennas) may be located in the warehouse in order to facilitate a two-way communication between the electronic tag(s) 1210 and the base station (e.g., controller). Specifically, the electronic tag 1210 may wirelessly communicate with the base station via a bi-directional wireless link. The wireless link may include, for example, a low frequency conductive loop requiring minimal power and allowing communication within a small area.

Further, the LCD 1230 may be programmed to display both numeric as well as alphanumeric information transmitted to the electronic tag (e.g., electronic module) via the base station. The circuitry may be solar powered or powered, for example, by a battery 1270 or other power source. Battery life using conventional alkaline batteries is likely to exceed five years, and with AAA batteries the life may be longer.

In the present invention, the container which contains an item (e.g., items) may be transferred to an area where the item can be sorted and stored (e.g., on shelves) in the warehouse. The location of the items (e.g., items in containers) can be random or predetermined. For example, the electronic tag 1210 may be used to help direct the placement of items at predetermined locations (e.g., on shelves) in the warehouse. For example, an item's proper location in the warehouse may be displayed on the LCD 1230 so that it may be easily viewed, for example, by handlers (e.g., picker/packers) at a distribution center. For instance, the items may be sorted and shelved in the warehouse, for example, by an expiry date.

For example, the items can be placed on shelves from left to right, front to back, upper to lower or lower to upper or in any other order, according to such factors as the expiry date of the item.

In addition, using the loop antenna, the base station (e.g., controller) may poll all of the electronic tags 1210 in the inventive system in search of a particular electronic tag 1210 and communicate only with that particular tag. For instance, the base station may poll each of the electronic tags 1210 located near (e.g., within) a loop antenna at a particular location (e.g., on a particular shelf) in the warehouse. Thus, the base station is capable of placing specific information on the display 1230, activating/deactivating the signaling device (e.g., flashing the light emitting diodes 1220), selectively activating each electronic tag 1210 associated with an item (e.g., an electronic tag 1210 affixed to a container which contains item).

For example, the item (e.g., containers of items) may be loaded onto shelves at the warehouse (e.g., distribution center). The loop antenna may, for example, be wired around the back and/or top of the shelf holding the items (e.g., containers). The loop antenna is wirelessly connected to the base station (e.g., controller) which can transmit and receive to all electronic tags 1210 located in the loop (e.g., located on a particular shelf).

Each electronic tag 1210 may have a unique identification number. The base station 120 may poll all of the electronic tags 1210 in the loop (e.g., in the transport vehicle) for a specific identification number, and then communicate only to that specific electronic tag. For example, the base station may place specific information on the display of the electronic tag, activate or deactivate the signaling device (e.g., LED) while selectively polling each electronic tag.

Figure 13:
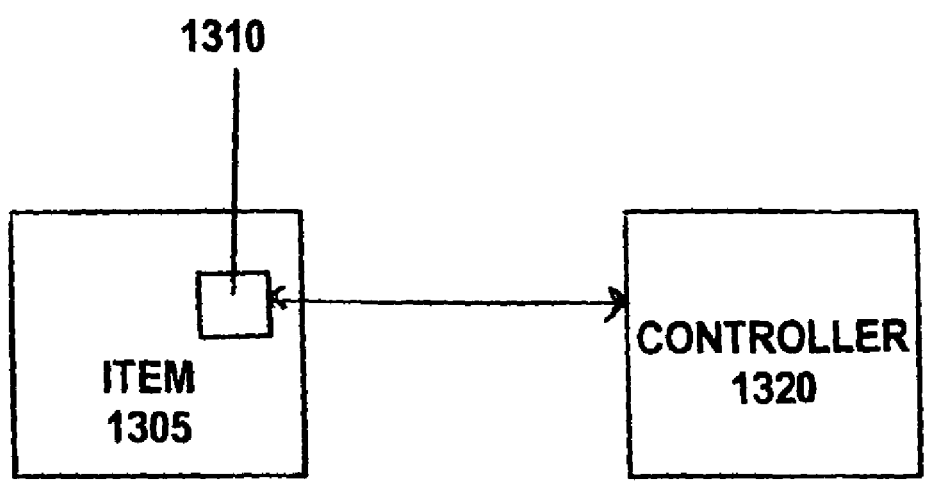
FIG. 13 illustrates another aspect of the present invention which includes an item 1305 to be warehoused, and a system 1300 for warehousing the item 1305.

FIG. 13 illustrate another aspect of the present invention which is similar to the aspects described above and, thus, the above descriptions of the various aspects of the present invention are incorporated by reference herein.

Specifically, as illustrated in FIG. 13, the present invention includes an item 1305 to be warehoused. The item 1305 includes an electronic module 1310 (e.g., RFID module described above) associated with the item for wirelessly communicating with a controller which controls a warehousing of the item 1305.

The present invention further includes a system 1300 for warehousing the item 1305. The system 1300 includes the electronic module 1310 associated with the item 1305, and a controller 1320 which wirelessly communicates with the electronic module 1310, for controlling a warehousing of the item 1305.

For example, the controller 1320 may control a warehousing of the item 1305 by controlling at least one of a location of the item and a movement of the item.

Further, the electronic module may be one of affixed to (e.g., by adhesive, staple, fastener, clip, screw, rivet, etc.) the item and integrally formed with the item. Thus, for example, where the item is a plastic device, the electronic module 1310 may be integrally formed with (e.g., embedded in) the plastic item. Further, the electronic module 1310 may be formed in (e.g., integrally formed in) an adhesive label which can be adhered to the item 1305.

With its unique and novel features, the present invention optimizes each employee's time and leads to highly efficient put away of products and highly efficient picking of products. The invention, therefore, offers affordable, state-of-the-art technology for managing and improving retail and warehouse operations. The inventive system and method may also be conveniently offered as an independent or integrated solution to supply chain needs.

While the invention has been described in terms of several preferred embodiments, those skilled in the art will recognize that the invention can be practiced with modification within the spirit and scope of the appended claims. For example, while a scenario has been discussed with various colored lights, obviously different colored lights could be used, as well as different formats for the lights (e.g., pulsing, flashing, etc.).

What is claimed is:

1. A warehousing system comprising:
   a first container for storing at least one item,
   a first electronic module affixed to said first container, said first electronic module having stored therein a unique identification number that distinguishes the first container from other containers for storing or receiving items in a warehouse;
   an antenna integrally formed in the first container and connected to the first electronic module;
   a controller which wirelessly communicates with said first electronic module, via the antenna, for activating a signal on the first electronic module for directing a transfer of said at least one item to and from said first container;
   a second container for receiving said at least one item from said first container,
   a second electronic module affixed to the second container, said second electronic module having stored therein a unique identification number that distinguishes the second container from other containers for storing or receiving items in a warehouse, said second electronic module wirelessly communicating with said controller, for facilitating a transfer of said at least one item from said first container to said second container.

2. The warehousing system according to claim 1, wherein said first electronic module comprises a light emitting device which is activated to indicate that said at least one item should be transferred to and from said first container.

3. The warehousing system according to claim 1, wherein said first electronic module comprises a display device for indicating a content of said first container.

4. The warehousing system according to claim 1, wherein said first container comprises a plastic tote.

5. The warehousing system of claim 1, further comprising:
   a facility comprising a shelving area and a picking area adjacent to but physically separate from said shelving area, and having a layout so as to minimize walking distance between the picking area and the shelving area.

6. The warehousing system of claim 5, wherein further comprising a plurality of warehouse antennas, wherein the controller can communicate with the antenna of the first container, or the second container or both at any location within the facility.

7. The warehousing system of claim 6, further comprising a conveyor belt disposed for transporting the first container between the shelving area and the picking area.

8. The warehousing system of claim 5, further comprising a conveyor belt disposed for transporting the first container between the shelving area and the picking area.

9. The warehousing system of claim 5, wherein the first container contains single merchandise item.

10. The warehousing system according to claim 1, wherein said controller wirelessly communicates with said first electronic module via a low frequency signal.

11. The warehousing system according to claim 1, wherein said first electronic module is integrally formed with said first container.

12. The warehousing system according to claim 1, wherein said item comprises a medical device.

13. The warehousing system of claim 1, wherein the first container contains single merchandise item.

14. The warehousing system of claim 1, wherein the first electronic module comprises two visual indicators providing distinguishable visual signals.

15. The warehousing system of claim 14, wherein the first electronic module further comprises a price display, and the controller causes the price display to display the price of the first item.

16. A warehousing method comprising:
   storing at least one item in a first container, said first container having a first electronic module affixed to said first container, said first electronic module having stored therein a unique identification number that distinguishes the first container from other containers for storing items in a warehouse;
   placing said first container in a shelving area;
   providing a communication to the first electronic module indicating that the item in the first container is to be picked for a purchaser;
   moving the first container from the shelving area to a picking area in the warehouse in response to the communication to the first electronic module;
   providing a communication to a second electronic module associated with a second container located in the picking area indicating that the item in the first container is to be picked for a purchaser by placement in the second container; and
   transferring said at least one item from said first container to the second container.

17. The method according to claim 16, wherein said item is accessible to be personally selected by in-store customers and remotely selected by out-of-store customers.

18. The method according to claim 16 wherein said first container comprises a plastic tote.

19. A warehousing system comprising:
   a first container for storing at least one item,
   a first electronic module affixed to said first container, said first electronic module having stored therein a unique identification number that distinguishes the first container from other containers for storing or receiving items in a warehouse, wherein the first electronic module comprises two visual indicators providing distinguishable visual signals;
   a controller which wirelessly communicates with said first electronic module for one of the two visual indicators on the first electronic module for directing a transfer of said at least one item to and from said first container;
   a second container for receiving said at least one item from said first container,
   a second electronic module affixed to the second container, said second electronic module having stored therein a unique identification number that distinguishes the second container from other containers for storing or receiving items in a warehouse, said second electronic module wirelessly communicating with said controller, for facilitating a transfer of said at least one item from said first container to said second container.

20. The warehousing system of claim 19, wherein the first electronic module further comprises a price display, and the controller causes the price display to display the price of the first item.

* * * * *